(12) United States Patent
Li et al.

(10) Patent No.: US 12,074,819 B2
(45) Date of Patent: Aug. 27, 2024

(54) ENHANCED SOUNDING FOR SECURE MODE WIRELESS COMMUNICATIONS

(71) Applicant: Intel Corporation, Santa Clara, CA (US)

(72) Inventors: Qinghua Li, San Ramon, CA (US); Xiaogang Chen, Portland, OR (US); Assaf Gurevitz, Ramat Hasharon (IL); Feng Jiang, Santa Clara, CA (US); Jonathan Segev, Sunnyvale, CA (US); Gadi Shor, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/477,247

(22) Filed: Sep. 28, 2023

(65) Prior Publication Data
US 2024/0031093 A1 Jan. 25, 2024

Related U.S. Application Data

(63) Continuation of application No. 17/214,609, filed on Mar. 26, 2021.

(60) Provisional application No. 63/023,558, filed on May 12, 2020, provisional application No. 63/021,836, filed on May 8, 2020, provisional application No. 63/012,534, filed on Apr. 20, 2020, provisional application No. 63/006,216, filed on Apr. 7, 2020, provisional application No. 63/001,237, filed on Mar. 27, 2020.

(51) Int. Cl.
*H04L 5/00* (2006.01)
*H04L 27/26* (2006.01)

(52) U.S. Cl.
CPC ............ *H04L 5/0048* (2013.01); *H04L 5/001* (2013.01); *H04L 5/0012* (2013.01); *H04L 27/2626* (2013.01)

(58) Field of Classification Search
None
See application file for complete search history.

(56) References Cited

U.S. PATENT DOCUMENTS

| | | | | |
|---|---|---|---|---|
| 4,890,302 A | * | 12/1989 | Muilwijk | ............ H04L 27/2017 375/325 |
| 2011/0013607 A1 | * | 1/2011 | Van Nee | ............. H04L 27/2621 370/310 |
| 2011/0235735 A1 | * | 9/2011 | Sari | ...................... H04B 7/0682 375/267 |
| 2021/0399930 A1 | * | 12/2021 | Yu | ............................ H04L 1/00 |

* cited by examiner

*Primary Examiner* — Robert M Morlan
(74) *Attorney, Agent, or Firm* — Eversheds Sutherland (US) LLP

(57) ABSTRACT

This disclosure describes systems, methods, and devices related to enhanced sounding for secure mode wireless communications. A device may generate a channel sounding symbol comprising a first subcarrier and a second subcarrier, wherein a first amplitude of the first subcarrier is different than a second amplitude of the second subcarrier. The device may generate a channel sounding signal comprising the channel sounding symbol. The device may send the channel sounding signal to a second device.

17 Claims, 30 Drawing Sheets

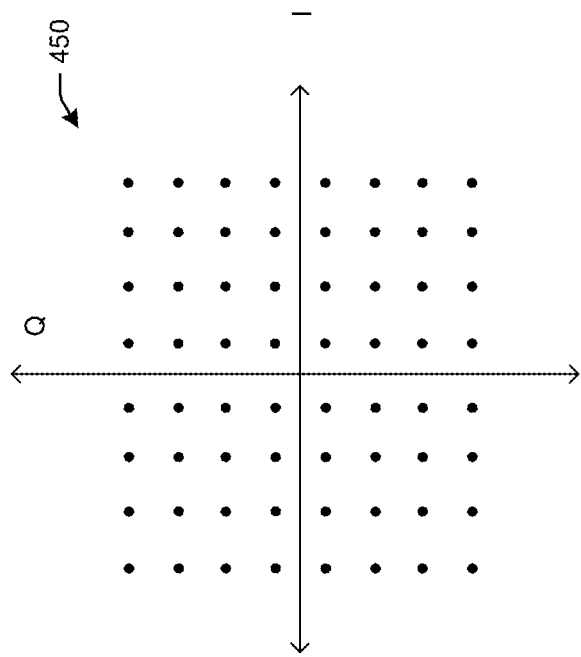
FIG. 4B
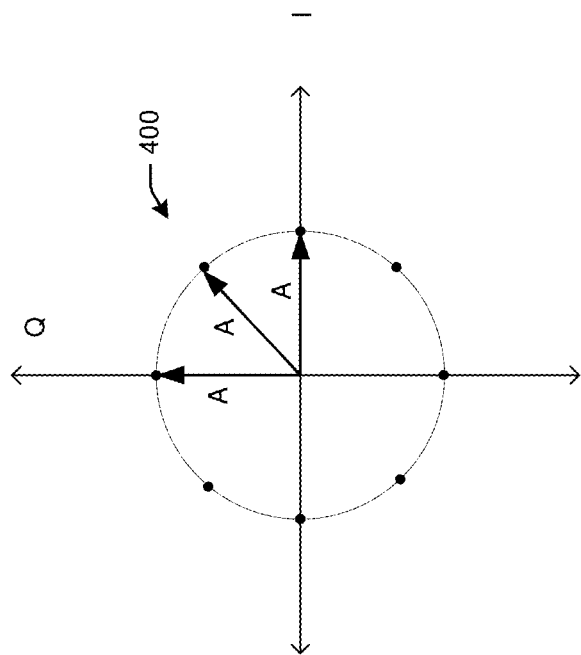
FIG. 4A
FIG. 4A and FIG. 4B

ENHANCED SOUNDING FOR SECURE MODE WIRELESS COMMUNICATIONS

CROSS-REFERENCE TO RELATED APPLICATIONS

This application is a continuation of U.S. Non-Provisional application Ser. No. 17/214,609, filed May 26, 2021, which claims priority to U.S. Provisional Patent Application No. 63/001,237, filed Mar. 27, 2020, to U.S. Provisional Patent Application No. 63/006,216, filed Apr. 7, 2020, to U.S. Provisional Patent Application No. 63/012,534, filed Apr. 20, 2020, to U.S. Provisional Patent Application No. 63/021, 836, filed May 8, 2020, and to U.S. Provisional Patent Application No. 63/023,558, filed May 12, 2020, all disclosures which are hereby incorporated herein by reference in their entirety.

TECHNICAL FIELD

This disclosure generally relates to systems and methods for wireless communications and, more particularly, to enhanced sounding for secure mode wireless communications.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

BRIEF DESCRIPTION OF THE DRAWINGS

FIG. 4A depicts a signal constellation using phase shift keying, in accordance with one or more example embodiments of the present disclosure.

FIG. 4B depicts a signal constellation using quadrature amplitude modulation, in accordance with one or more example embodiments of the present disclosure.

DETAILED DESCRIPTION

Figure 1:
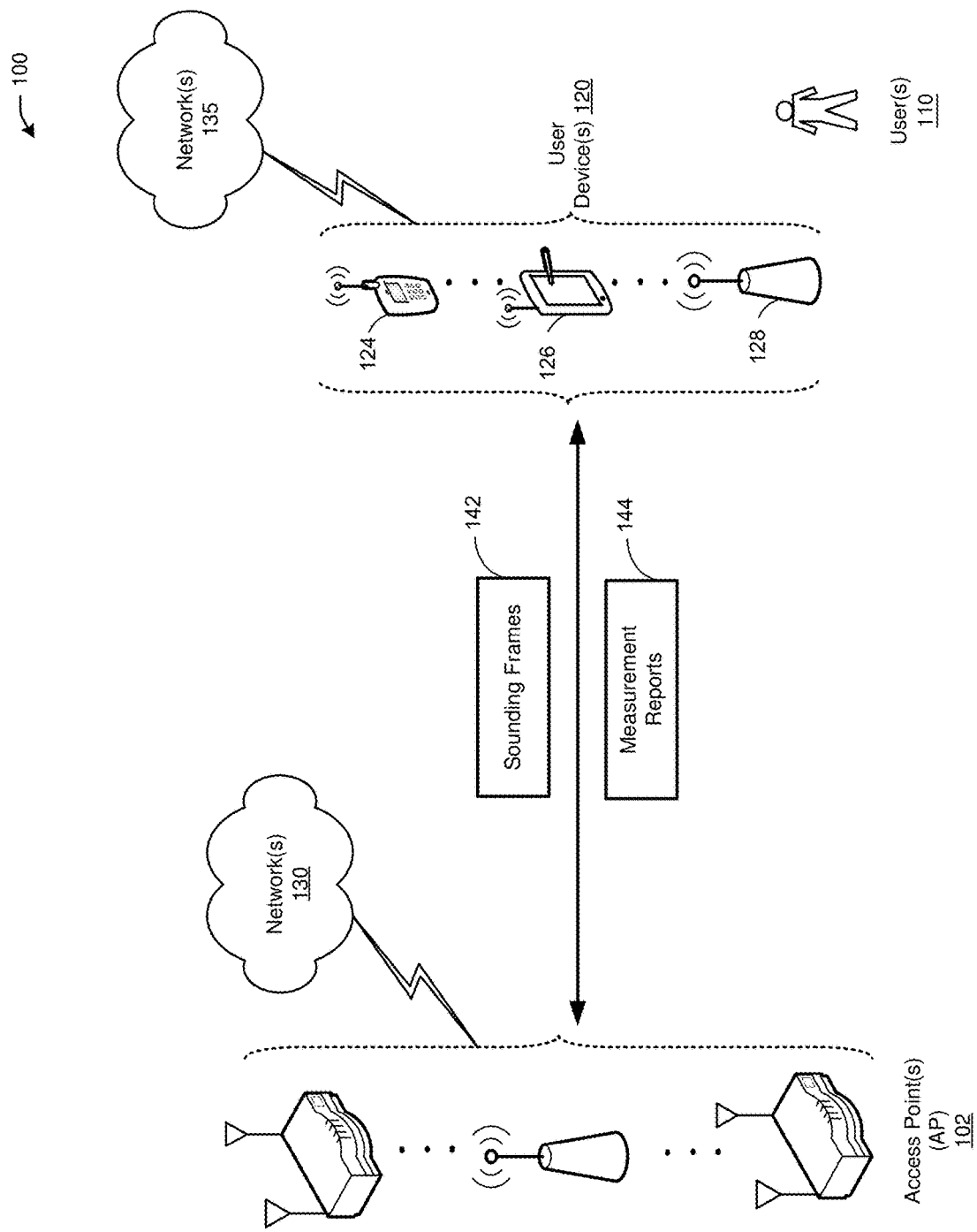
FIG. 1 is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

In wireless communications defined by the IEEE 802.11 technical standards, the very high throughput (VHT) null data packet (NDP) Sounding-based 802.11az protocol is referred to as VHTz, and the high efficiency (HE) null data packet (NDP) Sounding-based 802.11az protocol is referred to as HEz. In wireless communications defined by the IEEE 802.11 technical standards, the very high throughput (VHT) null data packet (NDP) Sounding-based 802.11az protocol is referred to as VHTz, the and high efficiency (HE) null data packet (NDP) Sounding-based 802.11az protocol is referred to as HEz. VHTz is based on the 802.11ac NDP and is a single user sequence, whereas HEz is based on 802.11ax NDP and 802.11az NDP and it supports multiuser operations.

In IEEE 802.11 communications, channel sounding refers to a process that allows devices to evaluate radiofrequency (RF) channels used for wireless communications. The IEEE 802.11 technical standards define processes for devices to exchange packets, such as NDPs, and use the NDPs to determine channel characteristics, determine relative device positions, and identify attempted attacks.

The 802.11az secure mode considers secure communications to address new attack models. For example, an attacker listens to the beginning portion of the sounding symbol used in channel sounding and detects which sounding signal is being sent. The attacker then sends the remainder of the sounding signal with a time shift such that the attacker's "fake" sounding signal arrives at an intended receiver with a fake channel arrival that is detected at the intended receiver. In this manner, an attacker may mimic a transmission from a non-attacker (e.g., "real" device) by sending a similar transmission to a receiving device, and timing the reception of the fake transmission to arrive just before the real transmission is to occur. The fake transmission from the attacker may result in the receiving device determining that the sender of the "real" transmission (the non-attacker) is closer to the receiving device than it actually is, thereby subjecting the receiving device to security vulnerabilities (e.g., unlocking for the attacker, etc.). To counter such attack attempts, enhanced feedback information may be provided from a sounding receiver to a sounding transmitter to allow for devices to detect attempted attacks.

One known solution to detect attacks is for a device to perform a consistency check on the channels estimated based on multiple channel soundings within the channel coherence time. A receiver device can check the power fluctuation in the residual interference and noise after cancelling out superimposed sounding signals from a received signal. If there is a significant power fluctuation, an alert may be triggered so that the ranging security gets protected.

Because the attacker may detect which sounding signal is sent with a small fraction of the sounding signal, some existing solutions may not detect the attack accurately. Some channel bandwidth may be wasted due to high false alarm rates (e.g., false positive attack detections).

Example embodiments of the present disclosure relate to systems, methods, and devices for Enhanced Sounding for 802.11az Secure Mode.

In one embodiment, an enhanced sounding for secure mode system may facilitate multiple attack mitigation enhancements. The first enhancement extends the current constant modulus constellation (i.e., 8PSK or QPSK) to higher order quadrature amplitude modulations (QAMs). One solution is to add a magnitude variation to a sounding signal so that the attacker cannot easily detect the sounding signal. The second solution extends the time-domain pulses to time-varying waveforms so that the information bits of the sounding signal are mixed together in both the frequency and the time domain. As a result, the attacker cannot break the search space in either the time or the frequency domain, and the attacker has to do a joint search in a space prohibitively large. The present disclosure provides multiple options to make the sounding signal carry more and more information so that the attacker cannot detect the sounding signal with a high success rate. The options may increase the signal mixing or entropy in both the frequency and time domains so that the attacker cannot use a frequency-time transformation to reduce the search space.

In one embodiment, an attack mitigation solution represents an extension of the 802.11az channel sounding signal. In 802.11az, each subcarrier of an NDP sounding symbol may have the same magnitude (e.g., amplitude). The solution to mitigate attempted attacks may allow magnitude changes across the subcarriers of an NDP sounding symbol. For example, 16-, 64-, 256-, 1024-, or higher order QAMs may be used. As a result, not only the number of phases increases from the 8PSK or QPSK, but also the magnitude carries additional bits (e.g., 8PSK carries three bits per symbol while 16PSK carries four bits per symbol). Therefore, the entropy of a sounding signal (e.g., an NDP with one or more sounding symbols) increases. The selection of the constellation point on each active subcarrier of an NDP sounding symbol may be determined by the output bits of a cypher as defined in 802.11az. Even though the attacker only observes the beginning part of the sounding signal, the attacker may still perform frequency-domain detection by converting the time-domain signal to the frequency domain (e.g., by a windowed Fast Fourier Transform). Because the windowed Fast Fourier Transform (FFT) introduces inter-subcarrier interference, the attacker needs some computation power to detect the QAM symbols on the subcarriers. Other attack mitigation solutions are described herein.

In 802.11az, channel sounding may send NDPs having one or more symbols (e.g., the number of symbols based on the number of spatial streams used in transmission or based on the number of long training fields—LTFs—used). The NDP symbols may be preceded in the NDP by other fields of the NDP, such as an HE-SIG-A field and an HE-STF field. The magnitude of an NDP symbol included in the NDP, as currently defined by 802.11az, may not vary from one subcarrier to another subcarrier. However, to make it more difficult to execute an attack using sounding signals, the magnitude may be allowed to vary across the different subcarriers of an NDP symbol.

The current HE-LTF defined by the 802.11 standards consists of a fixed or predefined sequence of BPSK symbols across the active subcarriers, which are not random. The secure mode of 802.11az replaces the fixed BPSK symbol sequence with a random 64QAM symbol sequence. The 802.11az long training field is referred to as HEz-LTF to be different from the conventional HE-LTF used in non-secure mode.

The proposed sounding signals enhance the security of 802.11az. The high complexity of detecting the sounding signal may deter attacks and protect device and transmission security.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment 100, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 8:
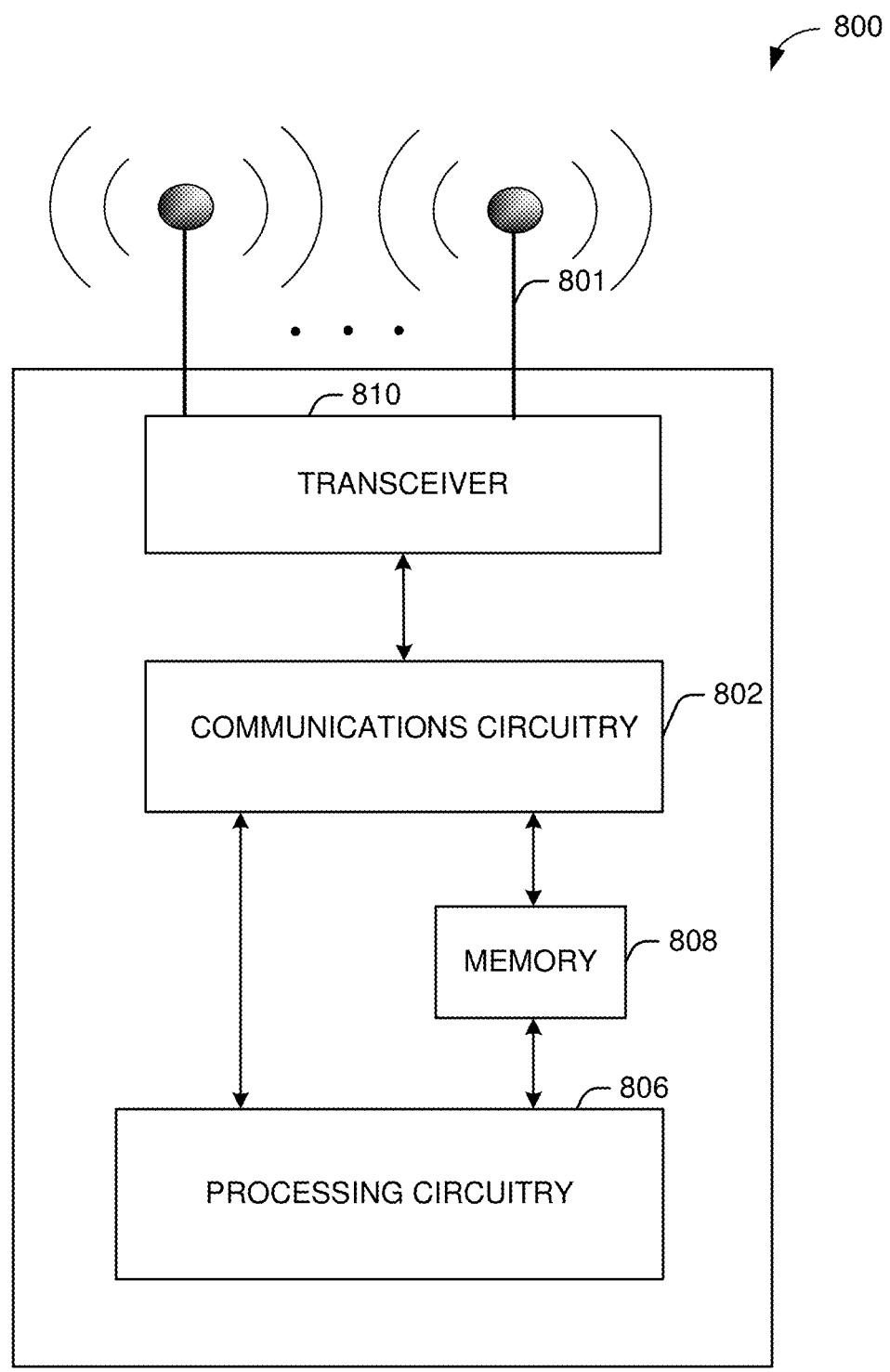
FIG. 8 illustrates a functional diagram of an exemplary communication station that may be suitable for use as a user device, in accordance with one or more example embodiments of the present disclosure.
Figure 9:
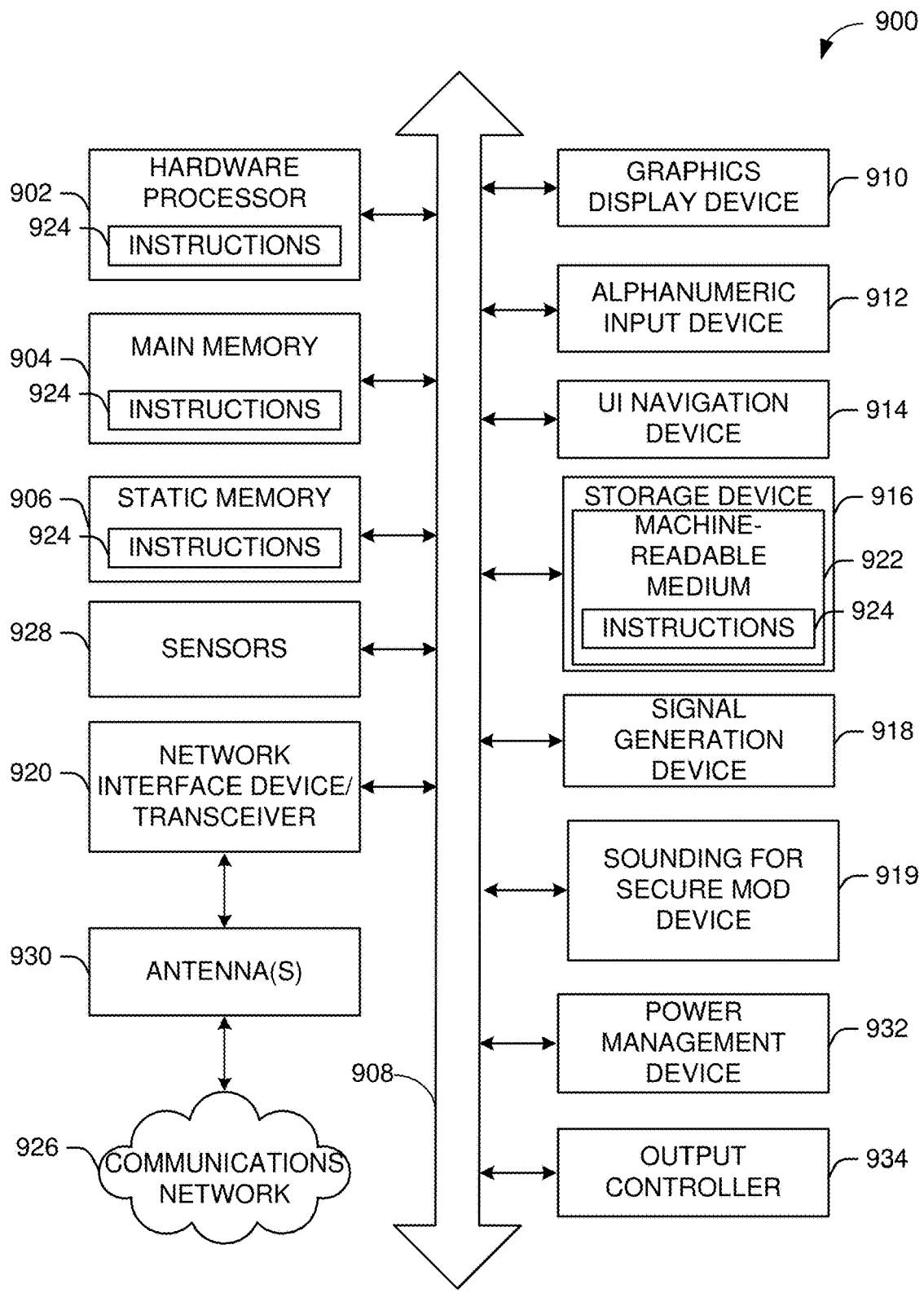
FIG. 9 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 8 and/or the example machine/system of FIG. 9.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay, 802.11az). 800 MHz channels (e.g. 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Figure 2A:
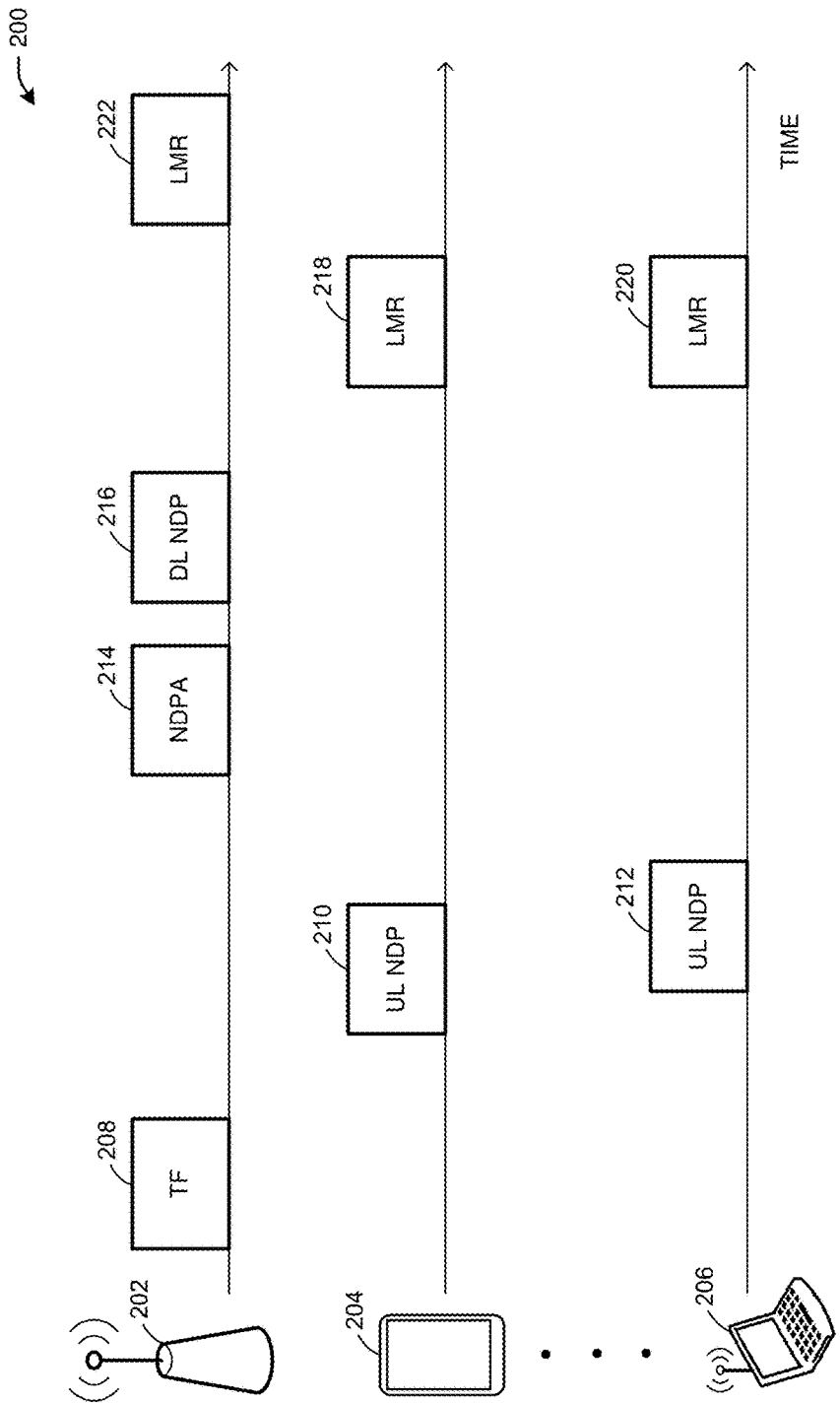
FIG. 2A depicts a schematic diagram for a trigger-based channel sounding process, in accordance with one or more example embodiments of the present disclosure.
Figure 2B:
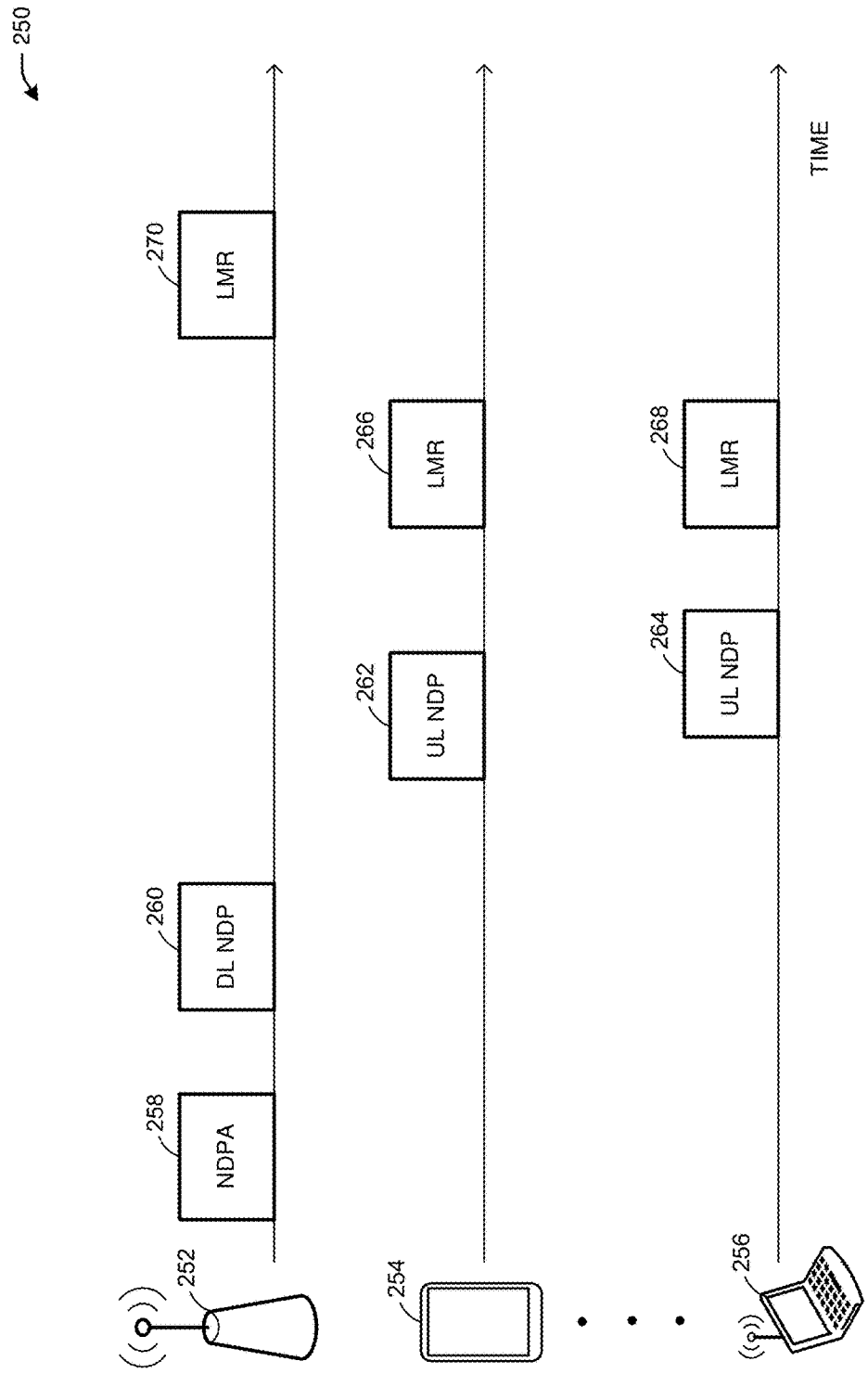
FIG. 2B depicts a schematic diagram for a non-trigger-based channel sounding process, in accordance with one or more example embodiments of the present disclosure.

In one embodiment, and with reference to FIG. 1, the AP 102 and/or the user devices 120 may exchange sounding frames 142 (e.g., NDPs, NDPAs, trigger frames, etc.) and measurement reports 144 (e.g., LMRs) as shown in FIGS. 2A and 2B. The sounding frames 142 and LMRs 144 may be used in channel sounding operations as explained further herein.

It is understood that the above descriptions are for purposes of illustration and are not meant to be limiting.

FIG. 2A depicts a schematic diagram for a trigger-based channel sounding process 200, in accordance with one or more example embodiments of the present disclosure. In IEEE 802.11 communications, channel sounding refers to a process that allows devices to evaluate radiofrequency (RF) channels used for wireless communications. The IEEE 802.11 technical standards define processes for devices to exchange packets, such as NDPs, and use the NDPs to determine channel characteristics, determine relative device positions, and identify attempted attacks.

Referring to FIG. 2A, an AP 202 may perform trigger-based channel sounding with an STA 204 and an STA 206, in accordance with the IEEE 802.11 standards. The AP 202 may send a trigger frame (TF) 208 (e.g., a frame that indicates to addressed devices are to send responses to the AP 202). In response to receiving the TF 208, the STA 204 may send an uplink (UL) NDP 210, and the STA 206 may send a UL NDP 212 as part of the channel sounding process (e.g., an NDP may lack a payload). Once the AP 202 has received the UL NDPs 210 and 212, the AP 202 may announce that it also will sound the channel by sending an NDP-announcement (NDPA) 214 frame announcing that a downlink NDP 216 is to be transmitted, and then transmitting the DL NDP 216. Based on the DL NDP 216, the STAs 204 and 206 both may determine CSI and other channel information, and may generate and send LMRs to the AP 202 (e.g., the STA 204 may generate and send LMR 218, and the STA 206 may generate and send LMR 220). For example, the LMRs 218 and 220 may include the respective ToA of the DL NDP 216 at the STA 204 and the STA 206, along with the ToDs and the PS of the UL NDP 210 and 212. The AP 202 may generate and send LMR 222 to the STAs 204 and 206, the LMR 222 including the ToAs of the UL NDPs 210 and 212, and the ToD and PS of the DL NDP 216 (or a previously sent DL NDP).

FIG. 2B depicts a schematic diagram for a non-trigger-based channel sounding process 250, in accordance with one or more example embodiments of the present disclosure. FIG. 2B refers to a sounding process similar to that in FIG. 2A, but without requiring a trigger frame.

Referring to FIG. 2B, an AP 252 may perform trigger-based channel sounding with an STA 254 and an STA 256, in accordance with the IEEE 802.11 standards. The AP 252 may send an NDPA 258 to announce the sending of a DL NDP 260, and may send the DL NDP 260. The STAs 254 and 256 may receive the DL NDP 260 and respond by sending UL NDPs (e.g., the STA 254 may send UL NDP 262, and the STA 256 may send UL NDP 264). After exchanging UL and DL NDPs, the AP 252 and the STAs 254 and 256 may generate and send respective LMRs. The STA 254 may send LMR 266, the STA 256 may send LMR 268, and the AP 252 may send LMR 270. The LMRs may include ToAs of frames received, ToDs of frames sent, and PS of frames sent by the respective device sending the LMR.

Figure 3A:
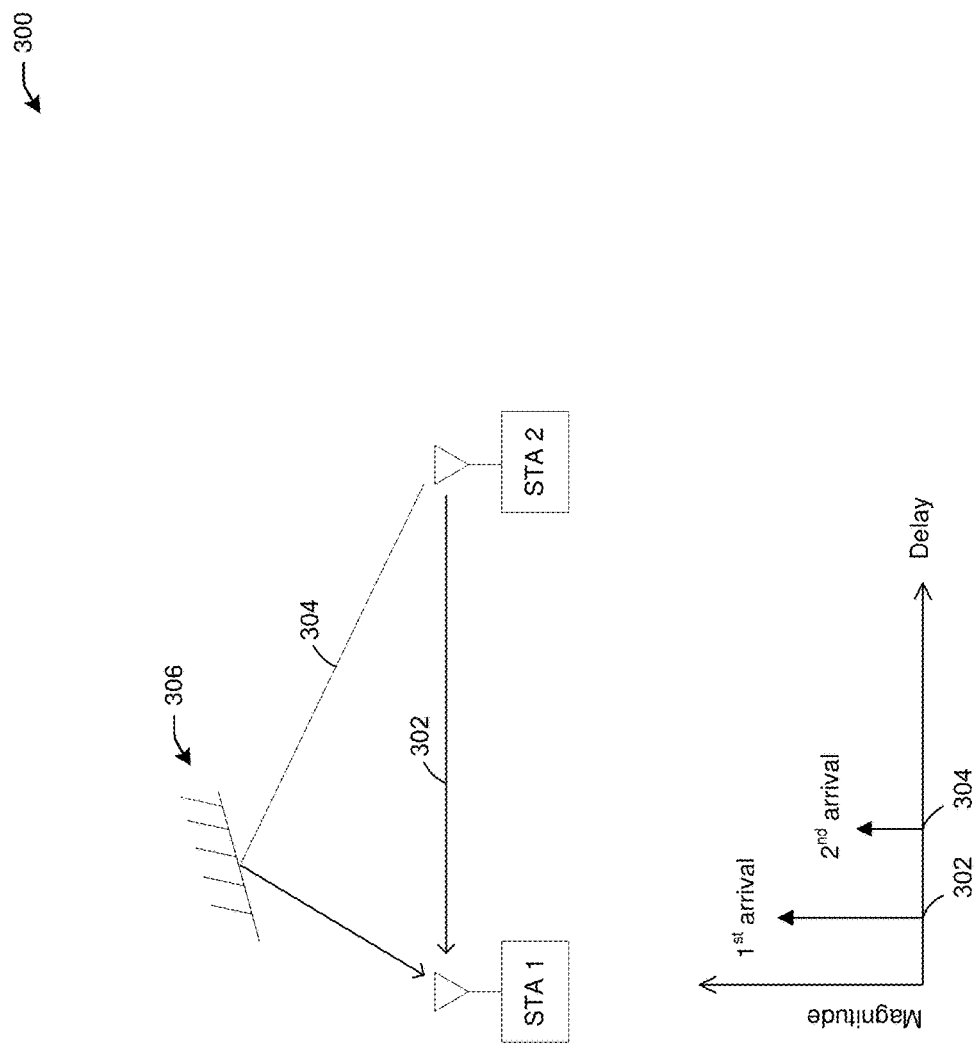
FIG. 3A depicts an illustrative system for a channel sounding process, in accordance with one or more example embodiments of the present disclosure.

FIG. 3A depicts an illustrative system 300 for a channel sounding process, in accordance with one or more example embodiments of the present disclosure.

Referring to FIG. 3A, the system 300 may include multiple devices (e.g., STA 1, STA 2) performing channel sounding. For example, the STA 2 may send a first sounding signal 302 and a second sounding signal 304 (e.g., NDPs as shown in FIGS. 2A and 2B). The second sounding signal 304 may reflect off of object 306 (e.g., an object or person), resulting in a different ToA than the ToA of the first sounding signal 302 at STA 1. As shown in FIG. 3A, the first arrival at STA 1 may be the ToA of the first sounding signal 302, and the second arrival at STA 1 may be the ToA of the second sounding signal 304. As shown, the magnitude of the first sounding signal 302 may be greater than the magnitude of the second sounding signal 304 (e.g., because the second sounding signal 304 reflected off of the object 306, which may be further away from STA 1 than is STA 2).

While not shown, the process may be bidirectional, in which case STA 1 may send sounding signals to STA 2 similar to the first sounding signal 302 and the second sounding signal 304, using the same paths, but in the opposite direction. The channel responses at both STAs should be the same, allowing for the STAs to determine whether any ToA is fake and likely generated by an attacker as shown in FIG. 3B.

Figure 3B:
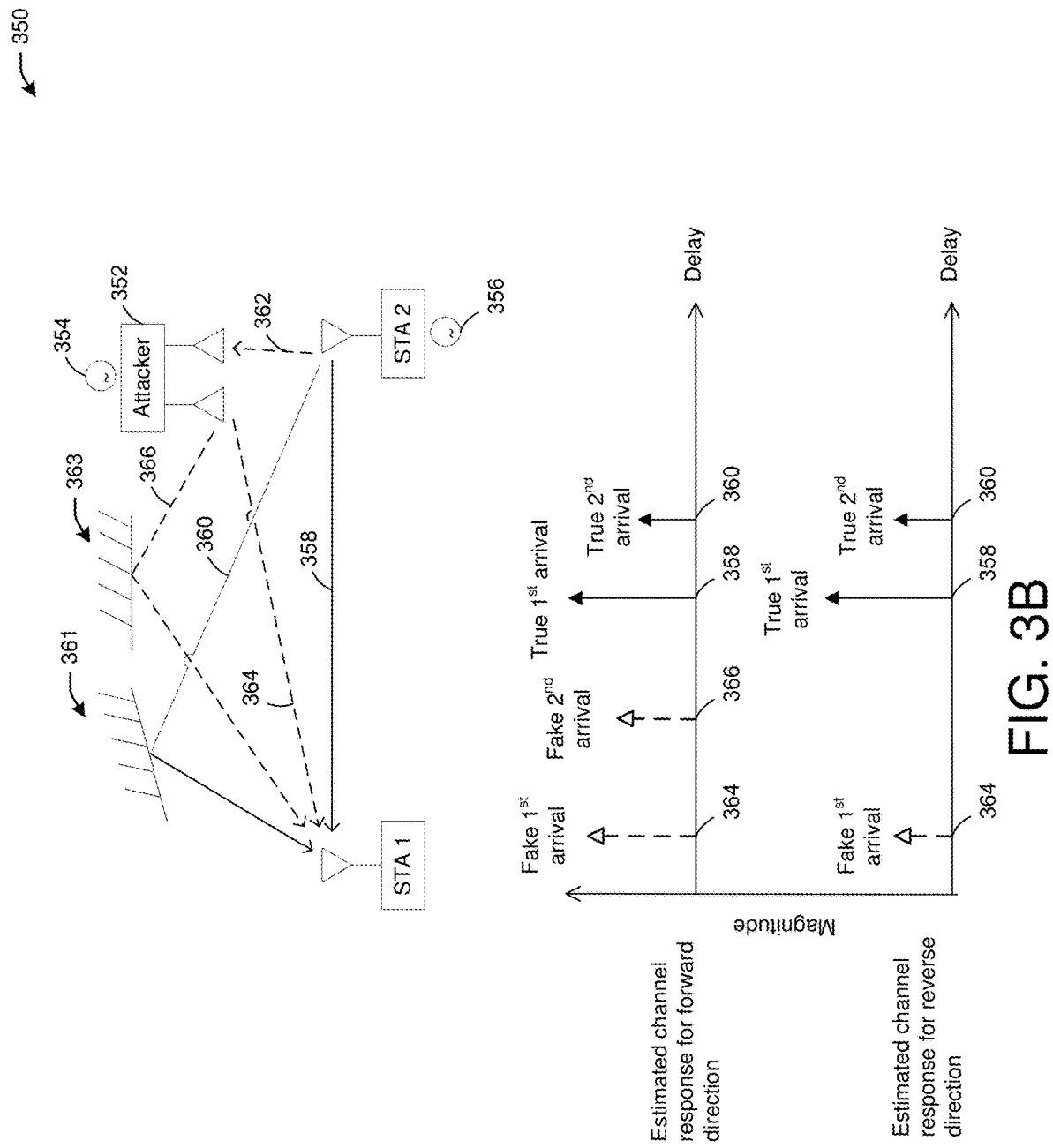
FIG. 3B depicts an illustrative system for a channel sounding process when an attacker exists, in accordance with one or more example embodiments of the present disclosure.

FIG. 3B depicts an illustrative system 350 for a channel sounding process when an attacker exists, in accordance with one or more example embodiments of the present disclosure.

Referring to FIG. 3B, the system 350 may include multiple devices (e.g., STA 1, STA 2) performing channel sounding. An attacker device 352 with an oscillator 354 may attempt to replicate sounding signals sent by STA 2, which may have an oscillator 356. For example, the STA 2 may send a first sounding signal 358 and a second sounding signal 360 (e.g., NDPs as shown in FIGS. 2A and 2B). The second sounding signal 360 may reflect off of object 361 (e.g., an object or person), resulting in a different ToA than the ToA of the first sounding signal 358 at STA 1. The attacker device 352 may receive a third sounding signal 362 from STA 2 and may replicate the third sounding signal 362 by sending a fourth sounding signal 364 and a fifth sounding signal 366, intended to arrive at STA 1 before the first sounding signal 358 and the second sounding signal 360.

Still referring to FIG. 3B, the estimated channel response in the forward direction (e.g., from STA 2 to STA 1) may include a fake first arrival (e.g., the ToA of the fourth sounding signal 364), a fake second arrival (e.g., the ToA of the fifth sounding signal 366), a true first arrival (e.g., the ToA of the first sounding signal 358), and a true second arrival (e.g., the ToA of the second sounding signal 360. The fifth sounding signal 366 may arrive at STA 1 later than the fourth sounding signal 364 (e.g., because it may reflect off of an object 363), but before the second sounding signal 360 to perpetrate an attack. Similarly, the fourth sounding signal 364 may arrive at STA 1 before the first sounding signal 358 to perpetrate an attack.

It is difficult for the attacker device 352 to generate the same fake multipaths in bidirectional soundings as the sounding signals sent by STA 1 and STA 2 such that the phases, delays, and amplitudes relative to the true multipaths are the same in both directions. To generate the same fake multipaths in both directions, the attacker device 352 needs the perfect calibration of the transmit and receive chains, the perfect synchronization to the intended transmitter clock (e.g., via the oscillator 354), the fine resolution detection of the multipaths in the received signal, and the knowledge of the randomized sounding signal. Among the difficulties, the synchronization needs to occur at the phase level not frequency level. The fine resolution multipath detection is also very challenging. Small multipaths need to be detected in the presence of the interferences from the strong multipaths. Furthermore, the attacker device 352 usually needs some time to analyze the beginning part of the received signal (e.g., the third sounding signal 362) so that the attacker device 352 can detect which sounding signal is being sent, and then sends the remaining part of the sounding signal with a time shift (e.g., the fourth sounding signal 364 and the fifth sounding signal 366). Therefore, the attacker's sounding signal for generating the fake first arrival is usually incomplete. Provided the difficulties, there are mismatches in channel responses estimated from the two directions as shown in FIG. 3B.

The mismatched responses (e.g., in the forward and reversed directions) in FIG. 3B may be used by the STAs to detect the attack and trigger an alert. In the measure report of current 11az secure mode, only {time of arrival (ToA), time of departure (ToD)} or {ToD, phase shift (PS)} are sent. There is no amplitude and phase information about the individual multipaths or the overall picture of the multipaths.

FIG. 4A depicts a signal constellation 400 using phase shift keying, in accordance with one or more example embodiments of the present disclosure.

Referring to FIG. 4A the constellation 400 shown is an 8PSK (phase shift keying) constellation in which each phase (e.g., angle) has the same amplitude A.

FIG. 4B depicts a signal constellation 450 using quadrature amplitude modulation, in accordance with one or more example embodiments of the present disclosure.

Referring to FIG. 4B the constellation 450 shown is an 64QAM (quadrature amplitude modulation) constellation in which the different phases have different amplitudes (e.g., distances from the 0,0 origin of the axes).

While FIG. 4A and FIG. 4B represent different constellations, other modulation and phase shift keying techniques may correspond to different constellations.

Figure 5A:
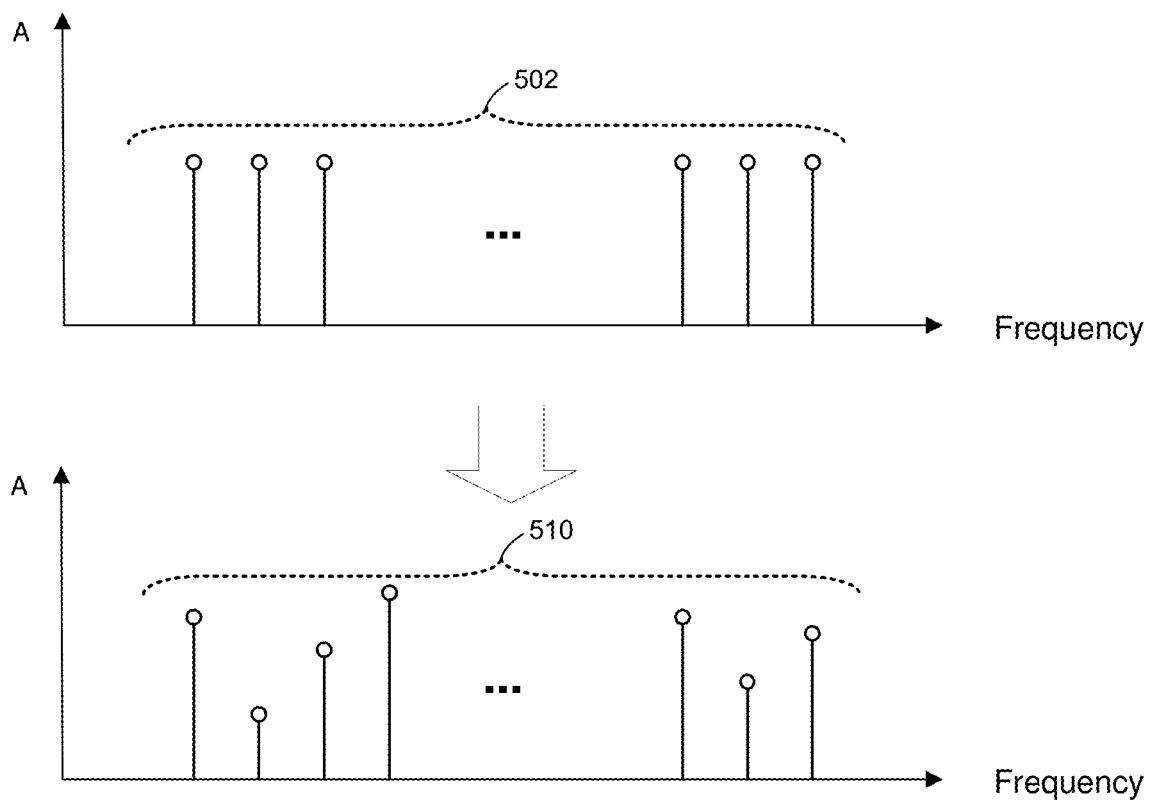
FIG. 5A depicts an example technique for enhanced channel sounding, in accordance with one or more example embodiments of the present disclosure.

FIG. 5A depicts an example technique 500 for enhanced channel sounding, in accordance with one or more example embodiments of the present disclosure.

Referring to FIG. 5A, the technique 500 represents an extension of the 802.11az sounding signal. In 802.11az, the symbol on each subcarrier may have the same magnitude (e.g., amplitude). The magnitude changes may be allowed across the subcarriers. For example, 16-, 64-, 256-, 1024-, or higher order QAMs may be used (e.g., FIG. 4B) for modulation of the sounding signal. As a result, not only the number of phases increases from the 8PSK or QPSK, but also the magnitude carries additional bits. Therefore, the entropy of the sounding signal increases. The selection of the constellation point on each active subcarrier may be determined by the output bits of a cypher like the current 802.11az.

In one or more embodiments, even though an attacker may only observe the beginning part of the sounding signal, the attacker may perform frequency-domain detection by converting the time-domain signal to frequency domain (e.g., by a windowed FFT). Because the windowed FFT introduces inter-subcarrier interference, the attacker needs some computation power to detect the QAM symbols on the subcarriers. However, the inter-subcarrier interference reduces as the window size increases. The attacker may be able to detect most of the QAM symbols after observing 80-90% of sounding signal, for example, and may generate an attack signal in the remaining 10-20% sounding time.

A signal's peak to average power ratio (PAPR) is relevant in channel sounding. In particular, a large PAPR may not be optimal for channel sounding, as a time-domain signal peak may be clipped, resulting in noise, bit error, and interference, thereby causing a distorted channel estimation. Data packets, such as sounding NDPs, may use 64QAM, which may experience a high PAPR. In this manner, by using higher order QAMs to vary amplitude, the sounding signal may be more difficult for an attacker to identify and copy, but with some risk of signal peak clipping and distorted channel estimation. Current channel sounding packets do not vary the signal amplitude with higher order QAMs in part because of the distortion risk.

In one or more embodiments, a long training field (LTF) of a sounding signal (e.g., the UL NDP 210 of FIG. 2A, the UL NDP 212 of FIG. 2A, the DL NDP 216 of FIG. 2A, DL NDP 260 of FIG. 2B, the UL NDP 262 of FIG. 2B, the UL NDP 264 of FIG. 2B) may be generated to include a sequence for secure mode communications. There may be 122 non-zero entries in the 20-MHz secure 2×LTF sequence. The mapping of pseudo random octets may be to the non-zero entries of the 20-MHz secure 2×LTF sequence, and then the 64-QAM values for each non-zero entry of the secure LTF sequence may be constructed. There may be up to $64^{122}$ secure LTF sequences available to be selected in an NDP for 20-MHz secure 2×LTF, as there are up to eight repetitions and up to eight secure LTF sequences within a repetition. For notational convenience each entry of the LTF sequence may be indicated with the integer k, which is an integer between zero and sixty three. A table may provide the pseudo random octet index for each nonzero subcarrier index in the secure LTF sequence. All entries in the secure LTF sequence other than the non-zero entries shall be set to zero. The six least significant bits (B0,1,B2,B3,B4,B5) of an octet, taking values from zero to sixty three, are used in the construction of the 64-QAM value for a 20-MHz secure sounding NPD, a 40-MHz secure sounding NDP, an 80-MHz secure sounding NDP, and a 160-MHz secure sounding NDP.

The current HE-LTF defined by the 802.11 standards consists of a fixed or predefined sequence of BPSK symbols across the active subcarriers, which are not random. The secure mode of 802.11az replaces the fixed BPSK symbol sequence with a random 64QAM symbol sequence. The 802.11az long training field is referred to as HEz-LTF to be different from the conventional HE-LTF used in non-secure mode.

Figure 5B:
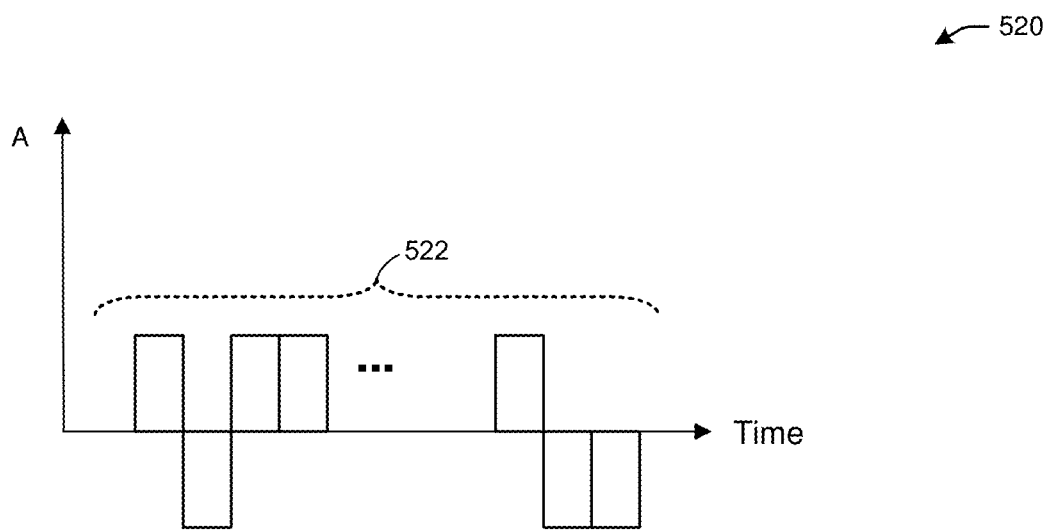
FIG. 5B depicts an example technique for enhanced channel sounding, in accordance with one or more example embodiments of the present disclosure.

FIG. 5B depicts an example technique 520 for enhanced channel sounding, in accordance with one or more example embodiments of the present disclosure.

Referring to FIG. 5B, to address a possible attack signal, time domain pulses 522 independent in time may be used as illustrated. Because the polarity or phase and/or magnitude of each pulse may be independent of the others, the attacker may not obtain any information about the current part of the sounding signal by analyzing a previous part of the sounding signal.

However, there may be limited choices for the time limited pulses 522. For example, one option is the pulse being generated by setting all the active subcarriers to be the same value (e.g., 1). The shape of this pulse may be close to a rectangle. The corresponding sounding signal (i.e., a sequence of pulses) may experience very little inter-pulse interference in the time domain. The attacker can detect the polarity or phase or magnitude of the pulse by analyzing the beginning part of pulse and generate an attack signal attacking the remaining part. For a 20 MHz sounding signal, the rectangular pulse width is about 50 ns. The attacker can generate a fake arrival ahead of the actual ones by 20 ns (i.e. 7 meters) if the receiver device does not have an attack detection mechanism. For time limited pulses other than the rectangle, the attacker can use a Viterbi algorithm to detect the polarity or phase or magnitude of the pulse by observing the beginning part of the pulse.

Figure 5C:
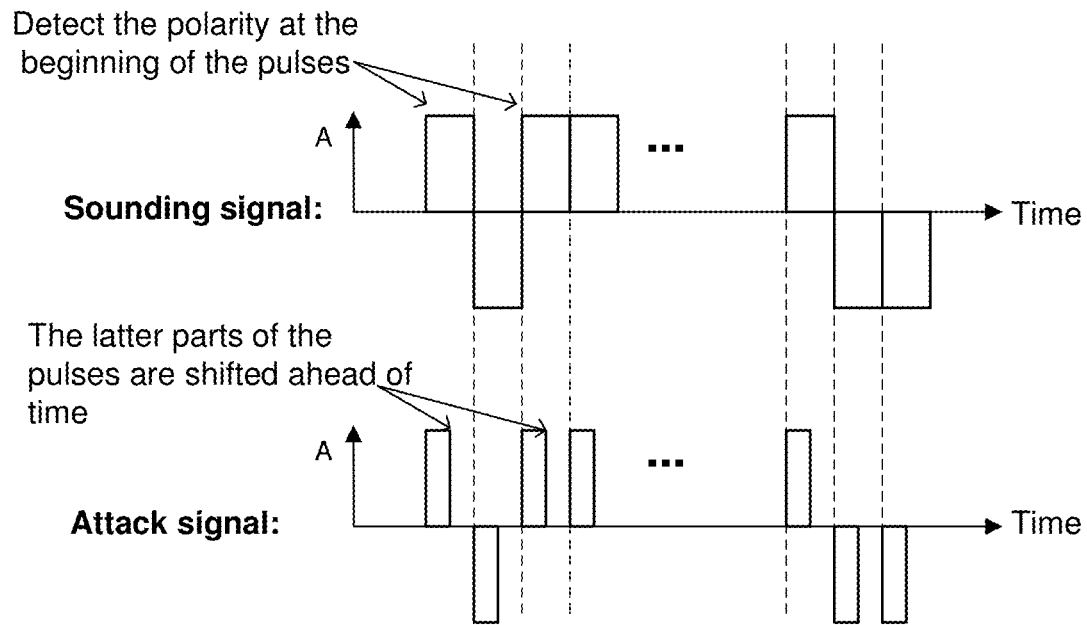
FIG. 5C depicts an example technique for enhanced channel sounding, in accordance with one or more example embodiments of the present disclosure.

FIG. 5C depicts an example technique 530 for enhanced channel sounding, in accordance with one or more example embodiments of the present disclosure.

Referring to FIG. 5C, to address an attack on a time limited pulse, strong inter-signal interference may need to be introduced as illustrated in FIG. 5C. Instead of a time limited pulse, a reference signal may have the duration the same as the sounding signal. The reference signal may be generated from the QAM symbols in the frequency domain the same way as the legacy OFDM symbol. The QAM symbols may be determined by the output bits of a cypher like the current 802.11az. The sounding signal consists of the reference signal and its (cyclically) shifted copies that may have different polarities or phases or/and magnitudes as illustrated in FIG. 5C. Namely, the time limited pulse in FIG. 5B may be replaced by the reference signal in FIG. 5C. The polarity or phase or magnitude of the shifted signals may be determined by the output bits of a cypher.

To make the system even more secure, instead of using shifted copies of the same reference signal, different reference signals may be used in FIG. 5C. Namely, the sounding signal consists of the superimposition of different reference signals. Each reference signal may be generated from a different set of QAM symbols in frequency domain. A different (cyclic) shift may be applied to each reference signal.

In general, the solution in FIG. 5C makes the sounding signal look like Gaussian signal in both time and frequency domains, which maximizes the entropy of each sample in time and frequency so that the attacker has a hard time to detect the sounding signal.

Figure 5D:
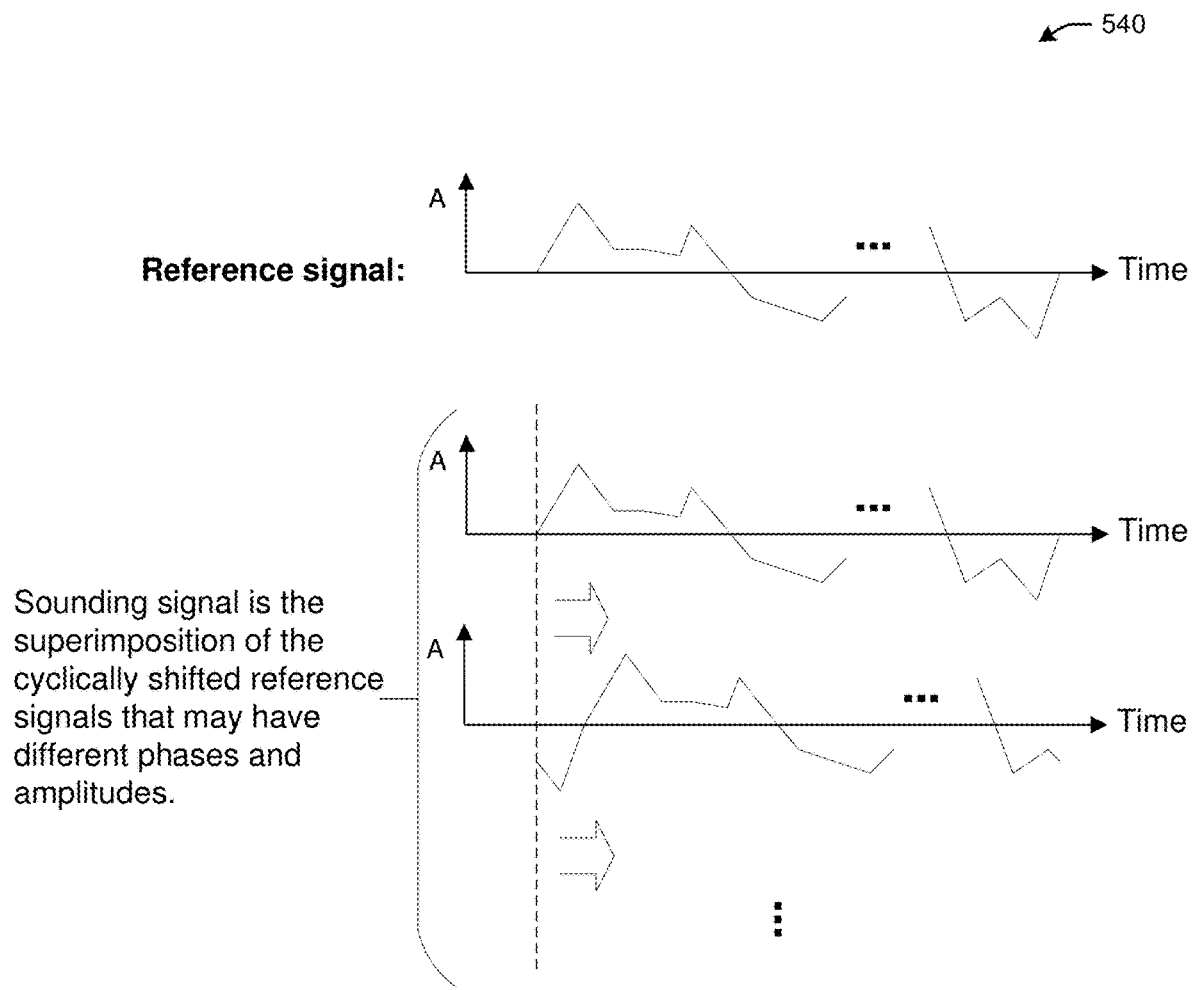
FIG. 5D depicts an example technique for enhanced channel sounding, in accordance with one or more example embodiments of the present disclosure.

FIG. 5D depicts an example technique for enhanced channel sounding, in accordance with one or more example embodiments of the present disclosure.

Referring to FIG. 5D, this option is the simplest extension of the existing solution in 802.11az secure mode. One possibility is using a fully random QPSK sequence to replace the 8PSK Golay sequence in 802.11az secure mode. Since the constellation points are denser in 8PSK than QPSK, the fully random 8PSK sequence is more secure than fully random QPSK sequence. It increases the entropy of the sounding signal and thus makes the attacker harder to detect the transmitting sounding signal. To enhance the security, 8PSK or 16PSK or higher order PSK constellation may be used for the secure mode. The PSK constellation has the same magnitude that sounds each active subcarrier with the same power. This makes the consistency check across the repeated soundings more stable than using a constellation with multiple magnitudes like 16QAM.

There are two ways to enhance the existing 802.11az secure mode. First, fully random 8PSK or 16PSK or higher order PSK sequences may be used to replace the existing 8PSK Golay sequences. For the fully random PSK sequence, the PSK symbols of the sequence are independently specified by the encryption bits, which are generated by a cypher using some exchanged parameters or are received from the other ranging party. Second, instead of replacing the Golay sequence by a fully random sequence, the Golay structure of 11az may be reused, but increase the constellation from 8PSK to a higher order PSK (e.g., 16PSK or 32PSK). The second method maintains the Golay structure so that the peak to average power ratio (PAPR) of the sounding signal in time domain is smaller than those of the fully random sequences. The smaller PAPR enables a higher transmission power and a longer working range for 802.11az.

Figure 5E:
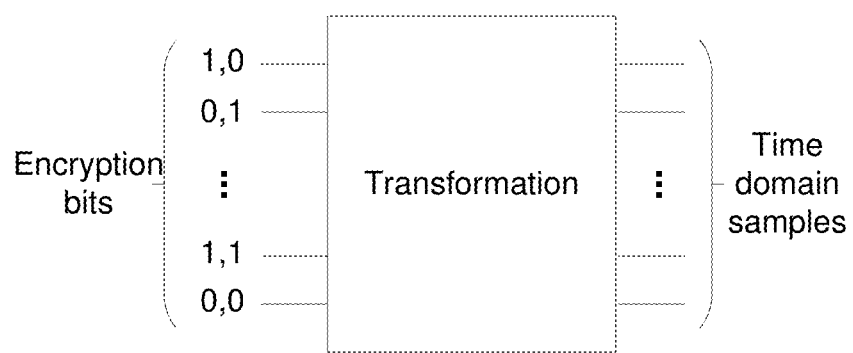
FIG. 5E depicts an example technique for enhanced channel sounding, in accordance with one or more example embodiments of the present disclosure.

FIG. 5E depicts an example technique 550 for enhanced channel sounding, in accordance with one or more example embodiments of the present disclosure.

Referring to FIG. 5E, the transformation from the encryption bits to the sounding signal should be unknown to the attacker so that it is hard for the attacker to detect the encryption bits by observing part of the sounding signal. The modulation like OFDM and direct sequence spread spectrum (DSSS), and the QAM mapping like Grey mapping, may be transformations known to the attacker. It may be beneficial to have a transformation unknown to the attacker as illustrated in FIG. 5E.

Figure 5F:
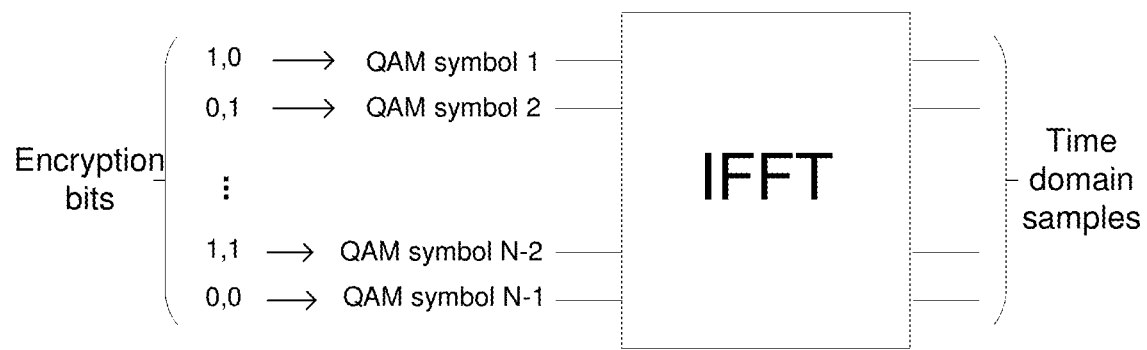
FIG. 5F depicts an example technique for enhanced channel sounding, in accordance with one or more example embodiments of the present disclosure.

FIG. 5F depicts an example technique 560 for enhanced channel sounding, in accordance with one or more example embodiments of the present disclosure.

Figure 5G:
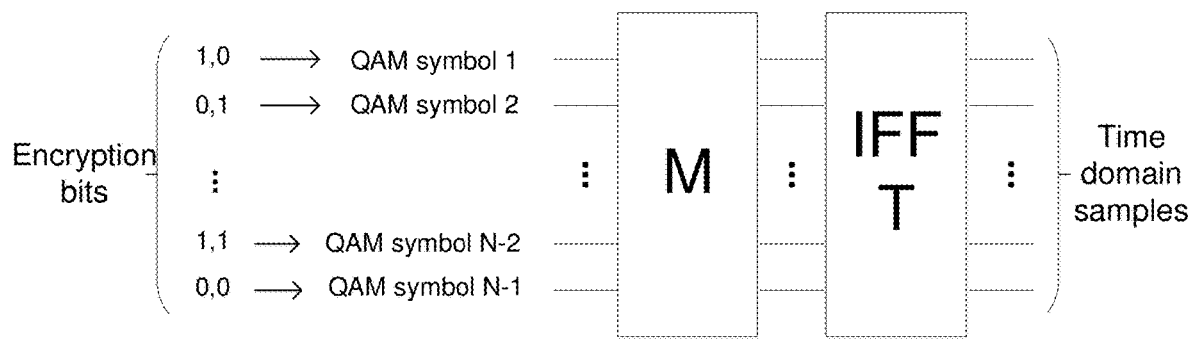
FIG. 5G depicts an example technique for enhanced channel sounding, in accordance with one or more example embodiments of the present disclosure.

Referring to FIG. 5F, to reuse the existing components in a transceiver, it may be beneficial to add a transformation before the inverse fast Fourier transform (IFFT) in FIG. 5F, which is unknown to the attacker, as illustrated in FIG. 5G.

FIG. 5G depicts an example technique 570 for enhanced channel sounding, in accordance with one or more example embodiments of the present disclosure.

In FIG. 5G, the transformation M is unknown to the attacker and may be changed for each sounding or each measurement. It is desirable that each element of the output vector of the transformation M should be determined jointly by all the encryption bits at the input vector. As a result, the attacker has to detect the encryption bits jointly instead of a divide-and-conquer fashion. The transformation M may be linear or non-linear. If it is non-linear, the operations of permutation and replacement may be applied. The input of M may be of N symbols each with a small alphabet e.g. QPSK or 16QAM and the output of M may be of L symbols each with a large alphabet whose size is desired to be an exponential (or quadratic or cubic function of N). For simplicity, N may be equal to L. Similarly, for simplicity, M may be linear as:

$$x = M\,s, \quad (1)$$

where s is the input symbol vector; and x is the output symbol vector. For even power distribution, M may be a unitary matrix, whose columns (or rows) are orthogonal with each other. In addition, the norms of the columns (or rows) of M may be the same. For example, a discrete Fourier transform (DFT_matrix is a unitary matrix. For another example, a rotation matrix is a unitary matrix. In fact, a unitary matrix can be viewed as a rotation matrix. The unitary matrix can be parametrized in various ways such as the Givens angles in 802.11n/ac/ax and the Householder vectors in the 802.16e/m technical standard.

Figure 6A:
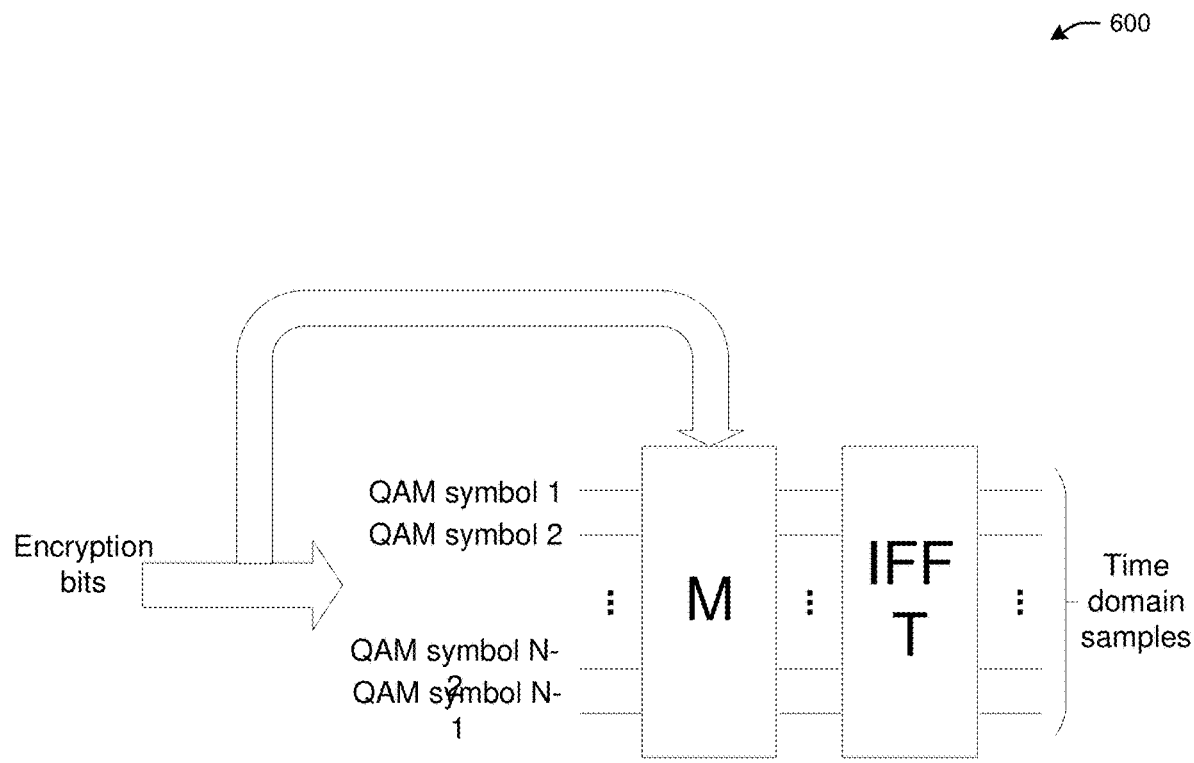
FIG. 6A depicts an example technique for enhanced channel sounding, in accordance with one or more example embodiments of the present disclosure.

FIG. 6A depicts an example technique 600 for enhanced channel sounding, in accordance with one or more example embodiments of the present disclosure.

Referring to FIG. 6A, because the attacker may learn the transformation M after listening to the soundings, the transformation M needs to vary with soundings. For example, it may be beneficial to have a large set of M matrixes such that the attacker may not know which of them is used for a specific sounding. As illustrated in FIG. 6A, the parameters of the transformation M may be determined by some of the encryption bits. The output of M are controlled by two parts, the input symbols and the parameters of M as illustrated in FIG. 6A. If the dimension of M is large enough e.g. greater than 100 or if the set of M is large enough, the input symbols may be fixed e.g. [1, 0, . . . 0] or [1, . . . 1] i.e. carrying no information for simplicity because the parameters of M already carry enough entropy for security protection. If a fixed input vector [1, 0, . . . 0] is used, the output vector is essentially the first column of M. Namely, the other columns of M are not used for the security protection. For the example of 802.11az sounding with 20 MHz bandwidth, there are 128 subcarriers. The matrix M can be 128 by 128. It can be parameterized by 16,256 Givens angles, whose ranges are $(0,2\pi]$ and $[0, \pi/2]$, respectively. Similar to the compressed feedback of 802.11n/ac/ax, the encryption bits can specify the Givens angles. If a higher security level is required, some encryption bits may be used to specify the various input symbols for the input vector s in Equation (1) above. For example, BPSK or QPSK symbols may be specified by the encryption bits.

A simplified way to generate a large set of M matrixes is permutation. The rows and/or the columns of a specific M matrix can be permuted to generate different M matrixes. The encryption bits specify the permutation of the M matrix. This technique is equivalent to permuting the elements of the input vector s before applying the transformation and then permuting the elements of the output vector x. Since the elements of the M matrix just move to other positions instead of changing to other values, the security protection level is not as high as the methods that change the values of the elements.

The matrix M in FIGS. 5G and 6A is of N by P, where N is the number of subcarriers (or active subcarriers) and P is the number of QAM symbols to be mixed together. Note that, P is not necessarily to be equal to N for reducing the complexity. For large bandwidths, the size of M is large e.g. 1024 and the matrix multiplications are of high complexities. For a low complexity, special matrixes with structures may be used as the matrix M e.g. binary matrix, FFT (or IFFT) matrix, and Hadamard matrix such that the complexity of the matrix multiplication is low. For example, the binary matrix with 1s and −1s only involve sign and addition operations. For another example, QPSK matrix with $\{1, -1, j, -j\}$ or $\{\pm 1 \pm j\}$ also only involve sign and addition operations. For a third example, the complexity of the FFT (or IFFT) matrix multiplication is $O(N \log N)$, which is lower than $O(N^2)$. In addition, the existing hardware for FFT (or IFFT) can be reused. Since the special matrix may be known to the attacker, some operations unknown to the attacker may need to be added after the matrix multiplication for further protecting the security. Two options are listed next.

Figure 6B:
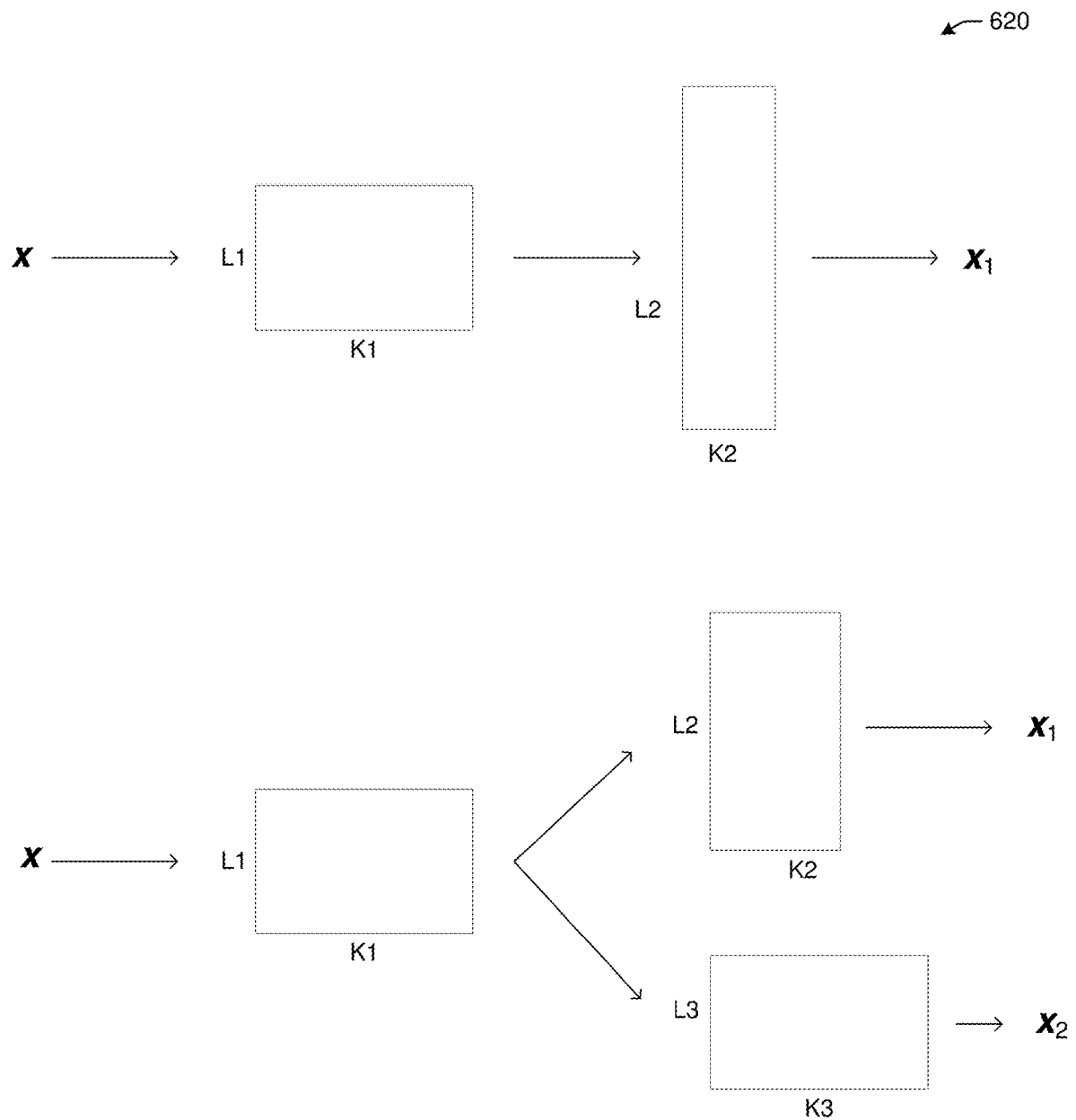
FIG. 6B depicts an example technique for enhanced channel sounding, in accordance with one or more example embodiments of the present disclosure.

FIG. 6B depicts an example technique 620 for enhanced channel sounding, in accordance with one or more example embodiments of the present disclosure.

Referring to FIG. 6B, the technique 620 is a special case for the technique 600 of FIG. 6A. After the matrix multiplication with M, the elements in the output vector x in Equation (1) above are permuted. For low complexity, the permutation may be constant and thus may be known to the attacker. For high security, the permutation varies so that it is unknown to the attacker. The total number of permutation combinations is N!, where N is the number of subcarriers (or active subcarriers). The complexity is prohibitive for the attacker to search for the permutation being used in a sending signal. For a simple implementation of the permutation, block interleavers may be used. A block interleaver may read in data symbols sequentially and fill out the rows of the interleaver row by row. When the data is read out, the data are read out column by column such that the symbol order is different from the one when the symbols are read in. The rows or columns do not need to be fully filled.

In the existing 802.11 system, interleavers are widely used. A parser may be added before the interleavers. The parser distributes input bits to different interleavers and then each interleaver permutes the bits distributed to the interleaver. The interleaved bits at the output of the interleavers are finally concatenated as the interleaved bits of the overall interleaving process. This idea can be reused here.

In FIG. 6B, some examples of interleaver are illustrated. In the top portion FIG. 6B, two block interleavers are used. The number of block interleavers is limited when a single block interleaver is used for the whole permutation. For example, for N=128, there are only less than 128 block interleavers such that the attacker may be able to use brute force search to find the interleaver being used. To increase the number of permutations, multiple block interleavers may be used. In the top portion FIG. 6B, two interleavers are serially concatenated. The total number of permutations is then multiplied e.g. close to N×N. For high security, more than two block interleavers can be used. In the bottom portion FIG. 6B, an example using a parser and interleavers is illustrated. The elements of input vector x are first interleaved and parsed. The parsed elements are distributed to multiple interleavers, respectively. The elements distributed to each interleaver are interleaved and the interleaved elements from the interleavers are concatenated for the next step. For simplicity, the first interleaver with parameters (L1, K1) may be not used, i.e. no interleaving before parsing, where L1 and K1 are the numbers for rows and columns of the block interleaver, respectively. The number of permutations is multiplied by choosing different block interleaver parameters i.e. $L_i$s and $K_i$s.

The permutation operation can be included in the matrix multiplication of Equation (1) above by permuting the rows of M.

Figure 6C:
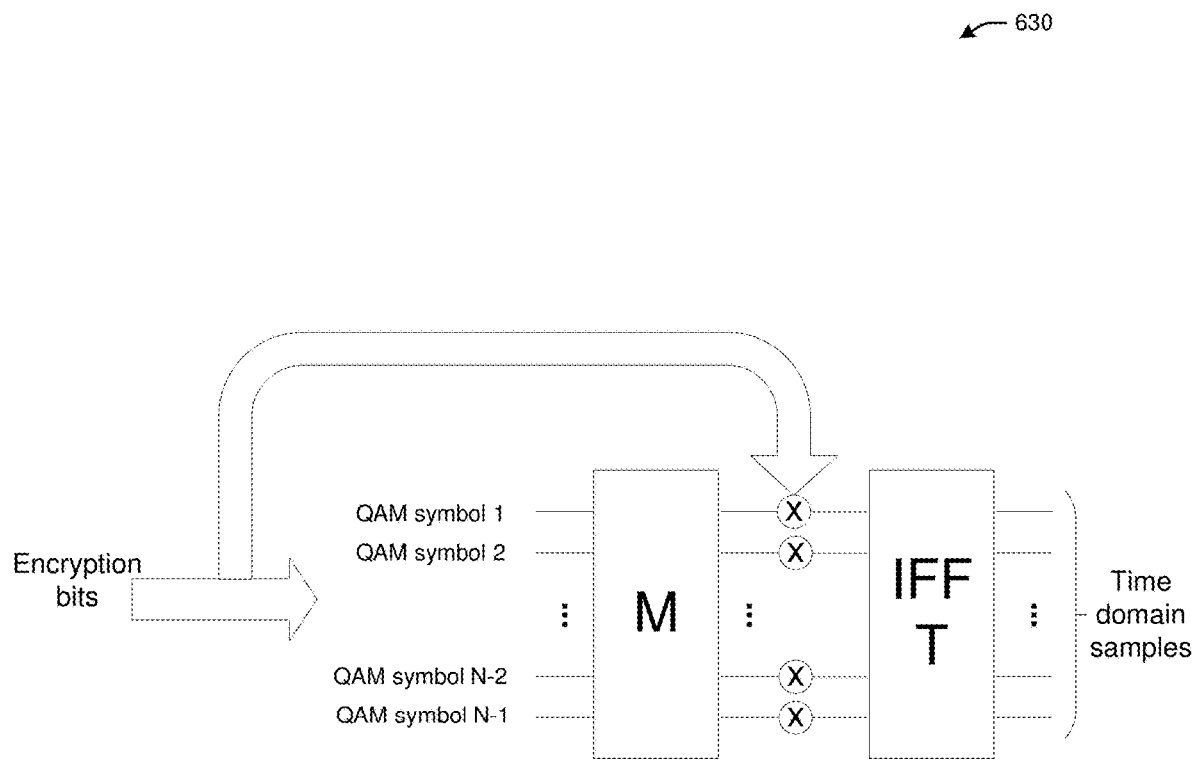
FIG. 6C depicts an example technique for enhanced channel sounding, in accordance with one or more example embodiments of the present disclosure.

FIG. 6C depicts an example technique 630 for enhanced channel sounding, in accordance with one or more example embodiments of the present disclosure.

Referring to FIG. 6C, instead of permutation, masking can be used to protect the security. It may be desired to prevent the attacker from seeing the individual encryption symbols in both time and frequency domains. For example, 802.15.4z UWB ranging sends individual time domain pulses sequentially, where the pulses are not interfered with each other. The attacker can predict the ending part of the pulse by detecting the beginning parting of the pulse without the interference from the other pulses. For another example, OFDM modulation sends individual frequency domain QAM symbols, where the QAM symbols do not interfere with each other. The individual signals in the two examples have low entropies such that the attacker can detect them reliably. It may be desirable that the attacker always observes mixed signals with high entropies in both the time and frequency domain.

In FIG. 6C, encryption bits generate two sets of the symbols. One is the QAM symbols to be mixed by the matrix M. The other is the sequence of masking symbols, which are multiplied with the mixed symbols in vector x of (1), respectively. For simplicity, the masking symbols may be of BPSK or QPSK e.g. $\{+1, -1\}$ or $\{1, -1, j, -j\}$, or $\{1+j, 1-j, -1+j, -1-j\}$ such that the masking operation only involves sign (and addition) operation. The encryption bits in FIG. 6C can be generated by a cypher like in the 802.11az standard. In one embodiment, the M matrix is the FFT matrix.

The options aforementioned can be jointly used together. For the ease of implementation, the number of the rows of matrix M may be a power of 2 (e.g., 128 and 1024). Some subcarriers may be reserved for DC, edges, and/or pilots. Therefore, if the number of the permuted or masked symbols (e.g., 128) is greater than that of the subcarriers available for carrying the secure sounding signal (e.g., 118), some permuted or masked symbols may not be used (i.e., not mapped to the subcarriers).

Figure 6D:
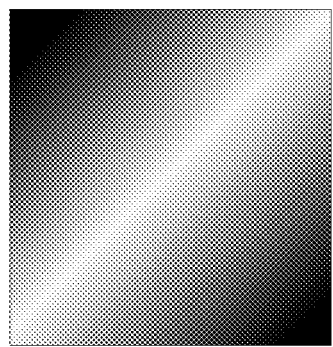
FIG. 6D depicts an example transformation matrix for enhanced channel sounding, in accordance with one or more example embodiments of the present disclosure.

FIG. 6D depicts an example transformation matrix 640 for enhanced channel sounding, in accordance with one or more example embodiments of the present disclosure.

The mixing of the encryption bits or symbols in FIGS. 5G and 6A preferably may be unknown to the attacker. In FIGS. 6B and 6C, permutation and scrambling are used such that the transformation M in FIG. 5G is unknown to the attacker and the transformation M remains a rotation matrix i.e. a unitary matrix. For the ease of implementation, the encryption symbols may be mixed by a filter. The filter can be linear or nonlinear. For linear filters, finite impulse response (FIR) or infinite impulse response (IIR) can be used. Although the linear filters can be implemented in the form of the transformation matrix M as illustrated in FIG. 6D, the conventional delay taps are of a low complexity. Namely, the encryption symbols carrying the encryption bits are passed through a linear filter with registers to get mixed signals at the output of the filter. For FIR filters, the larger the number of taps the securer of the system. For IIR filters, the number of taps may not need to be large, but the precision requirement may need to be high. Otherwise, the cumulative errors at the end of the output can be large. Both linear filters may need initialization and termination. The registers may be initialized by all zeros. Or, the input symbols to the filters may be treated in a circular or wrap around fashion. For example, the beginning and the end of the input symbols are connected with each other such that the input symbols form a loop. The symbols at the end can be used for the initialization of the beginning ones. For simplicity, the filter taps may be chosen from a finite (or structured) alphabet for a low complexity. For example, the alphabet may be $\{+1,-1\}$ or $\{1+j, -1+j, 1-j, -1-j\}$, which may not incur real multiplications in the filter operation.

In one or more embodiments, the transformation matrix 640 (M) for linear filters may have a Toeplitz structure.

When the attacker observes the beginning portion of the sounding signal and converted the observed signal into frequency domain. The windowed FFT introduces intercarrier interferences. It is similar to applying a FIR filter, which is the spectrum of the windowing function, to signals on each subcarrier. If the window size is a quarter of the sounding signal, the number of significant taps of the FIR filter is about 11, which is not a large number for the attacker to break the system. Additional filter taps may be introduced, which expands the taps due to the windowing, by the sounding transmitter. This makes it difficult for the attacker to break the system.

Figure 6E:
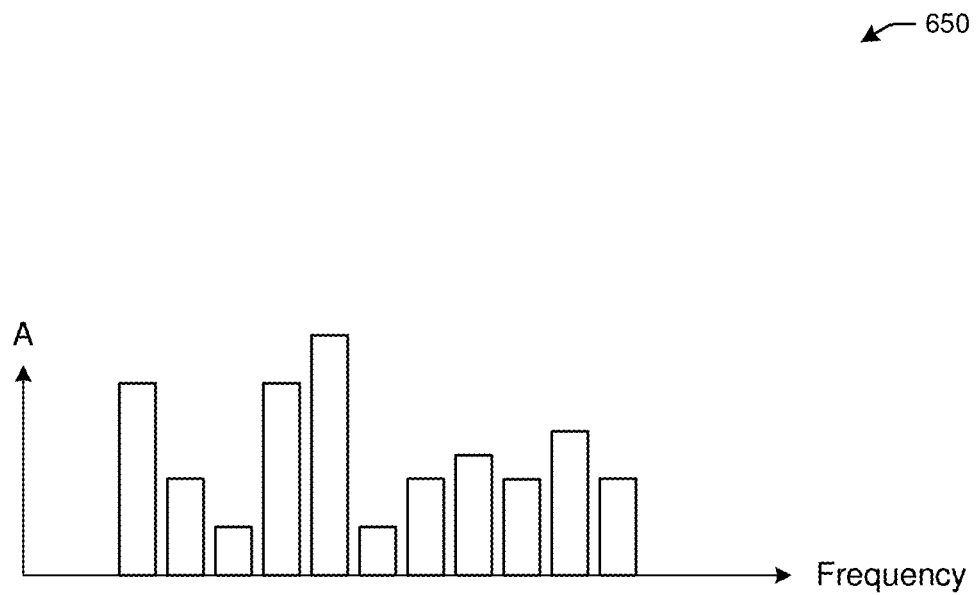
FIG. 6E depicts an example technique for enhanced channel sounding, in accordance with one or more example embodiments of the present disclosure.

FIG. 6E depicts an example technique 650 for enhanced channel sounding, in accordance with one or more example embodiments of the present disclosure.

The encryption bits or symbol mixing in FIGS. 5G, 6A, 6C, and 6D may cause unequal sounding powers across frequency as illustrated in FIG. 6E. For a specific sounding, some subcarriers may not have enough sounding signal power. This may reduce the accuracy of channel estimation or time of arrival (ToA) estimation. In addition, different soundings for the same channels may have different sounding power profiles across frequency. This may affect the consistency check used by attack detection.

To mitigate the problem, the magnitude range of the sounding signal on the subcarriers may be limited. For example, a minimum limit can be set. If the sounding signal on a subcarrier is below the limit, the signal is boosted to the minimum limit. Similarly, a maximum limit can be set. If the sounding signal on a subcarrier is above the limit, the signal is caped to the maximum limit. Since the limits may be known to the attacker, it is desirable that the magnitude outside the range limits is mapped to a value inside the range limits not always at the limits. For example, mod operation may be used as Equation (2):

$$\alpha_{out} = \alpha_{MIN} + \mathrm{mod}(\alpha_{in} - \alpha_{MIN}, \alpha_{MAX} - \alpha_{MIN}), \quad (2)$$

where $\alpha_{in}$ and $\alpha_{out}$ are input and output magnitudes, respectively; $\alpha_{MAX}$ and $\alpha_{MIN}$ are the upper and lower limits of the magnitudes, respectively.

In another mitigation option, the encryption bits or symbols mixing in FIGS. 5G, 6A, 6C, and 6D may cause unequal sounding powers across frequency as illustrated in FIG. 6E. For a specific sounding, some subcarriers may not have enough sounding signal power. This may reduce the accuracy of channel estimation or time of arrival (ToA) estimation. In addition, different soundings for the same channels may have different sounding power profiles across frequency. This may affect the consistency check used by attack detection.

For constant sounding power across frequency, high order PSK signal (e.g. 16PSK and higher PSK) may be used. For low order PSK signals (e.g. 8PSK), the attacker may observe the beginning part (e.g. ¼ of the sounding signal) and use Viterbi equalizer in the frequency domain to detect the transmitting signals on each subcarrier so that the attacker can regenerate the sounding signal with a time shift. For security, randomized phase rotations may be applied to the PSK symbols on the subcarriers, respectively. The randomized phase rotation is unknown to the attacker but known to the intended receiver. The rotated phases may be determined part of the encryption bits.

To further increase the sounding signal entropy, the phase of each subcarrier may be jointly determined by all or a large portion of the encryption bits. For example, the ideas in the previous options can be reused. The symbol vector in Equation (1) and the QAM symbols in FIGS. 5G-6C can be replaced by angle vector or angles. The angles are determined by the encryption bits. For example, the two encryption bits selects one angle out of {0 degree, 90 degrees, 180 degrees, 270 degrees}. The angles picked from a finite alphabet are then transformed by mixing and/or scrambling. For the ease of implementation, Hadamard matrix, FFT matrix, IFFT matrix, or linear filters may be used for the mixing. After the transformation, some output angles may be removed for accommodating the DC and edge subcarriers and the remaining are used as the phases for the active subcarriers in the sounding.

As compared with the other options whose signal magnitude can vary across subcarriers, the security level of this option is reduced due to the entropy reduction in magnitude.

Figure 6F:
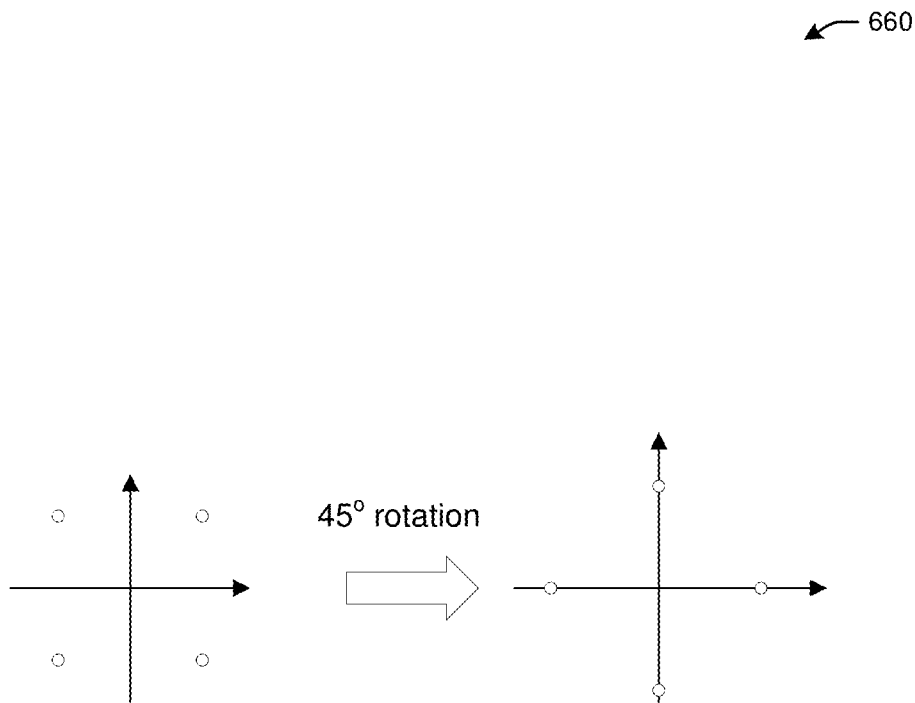
FIG. 6F depicts an example technique for enhanced channel sounding, in accordance with one or more example embodiments of the present disclosure.

FIG. 6F depicts an example technique 660 for enhanced channel sounding, in accordance with one or more example embodiments of the present disclosure.

In one mitigation option, high order QAM is used for the ease of implementation. However, since the attacker knows the constellation, the attacker can observe the beginning part of the sounding signal and detect the QAM symbols e.g. using Viterbi equalizer and sphere decoder in frequency domain. To make the detection difficult for the attacker, the constellation of each subcarrier can be changed. For example, it can be rotated by an angle, which may be unknown to the attacker. An example is shown in FIG. 6F. Since the original QAM constellation is symmetric about real axis, imaginary axis, and the origin, the rotation angles can be chosen from (0 degree, 90 degrees] or [0 degree, 90 degrees). For example, $\{0, \pi/4\}$, $\{0, \pi/8, \pi/4, 3\pi/8\}$, or $n\pi/N$ for $n=0, 1, \ldots, \lceil N/2 \rceil - 1$. For each active subcarrier, some of the encryption bits select the constellation point from the constellation and some encryption bits select the rotation. Since the attacker only know the constellation but doesn't know the rotation angle, the attacker has to search the constellations for all the angles. For the example in FIG. 6F, the eight constellation points from the two constellations are the increased search space. This increases the search space and reduces the success rate of the attack.

Figure 6G:
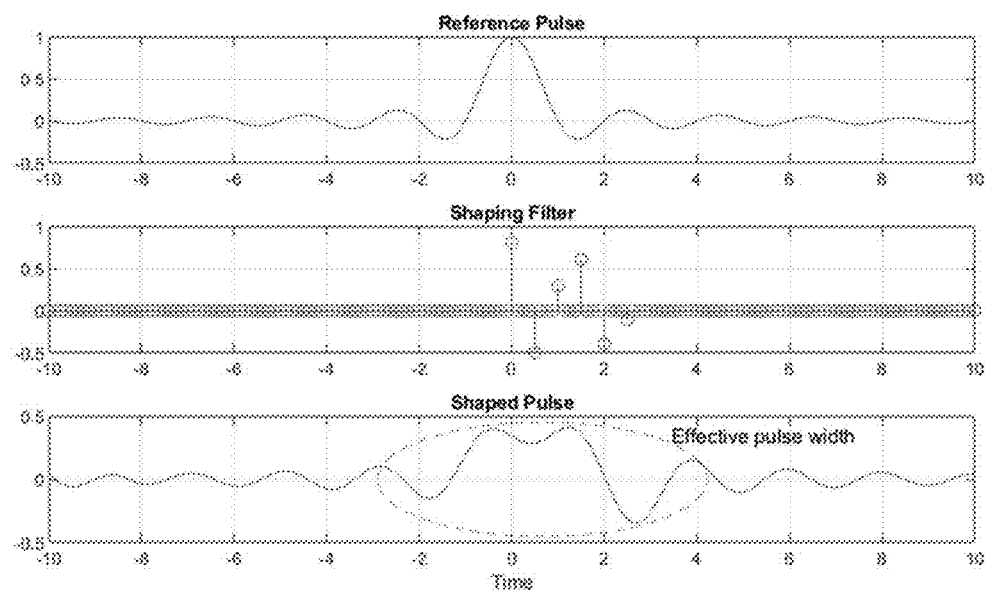
FIG. 6G depicts an example technique for enhanced channel sounding, in accordance with one or more example embodiments of the present disclosure.

FIG. 6G depicts an example technique 670 for enhanced channel sounding, in accordance with one or more example embodiments of the present disclosure.

Referring to FIG. 6G, it is desirable that the previous portion of a sounding signal does not provide information about the remaining portion of the sounding signal so that the attacker cannot learn from the previous portion to predict the remaining portion. From this perspective, time domain pulses with a limited pulse duration are an option. However, if the pulse duration is long and the pulse shape is known to the attacker, the attacker can send the ending portion of the pulse with a time advancement by detecting the beginning of the pulse. Therefore, it may be beneficial to either to reduce the pulse duration or to make the pulse shape unknown to the attacker. Increasing the sounding signal bandwidth can reduce the pulse duration. However, for a given 20 MHz bandwidth whose pulse duration is longer than 50 ns, the pulse shape may need to be unknown to the attacker.

For generating different pulses unknown to the attacker, a delta function or reference pulse is passed through a filter as illustrated in FIG. 6G. In FIG. 6G, the reference pulse on the top portion may be a delta function or a Nyquist pulse or a time domain signal whose spectrum is a constant across the active subcarriers. A shaping filter is illustrated in the middle portion of FIG. 6G. The shaping filter is for changing the shape and the effective width of the reference pulse. A new pulse is generated by filtering the reference pulse using the shaping filter. The new pulse is illustrated in the bottom portion of FIG. 6G.

Still referring to FIG. 6G, the effective width of the shaped pulse may be wider than the reference pulse's width. The wider width is desirable for generating inter-symbol interference among the shaped pulses sent sequentially. Namely, the wider width causes overlaps among the sounding pulse sequence such that the attacker cannot detect the polarity or phase or amplitude of the overlapped pulses easily. In another word, the security of the sounding signal is protected by the inter-pulse interference. From another viewpoint, the shaping filter introduces artificial multipaths at the sounding transmitter, which are unknown to the attacker. For high level of security, more than ten taps may be desired. Furthermore, the effective width of shaped pulse is desired to cause inter-pulse interference among more than ten shaped pulses such that the complexity for undoing the inter-pulse interference is prohibitive for the attacker, who may not know the shaping filter taps. The taps of the shaping filter may be determined by encryption bits. In addition, the taps may be chosen from QAM constellation e.g. 16-, 64-, and 256-QAM for the ease of implementation.

Figure 6H:
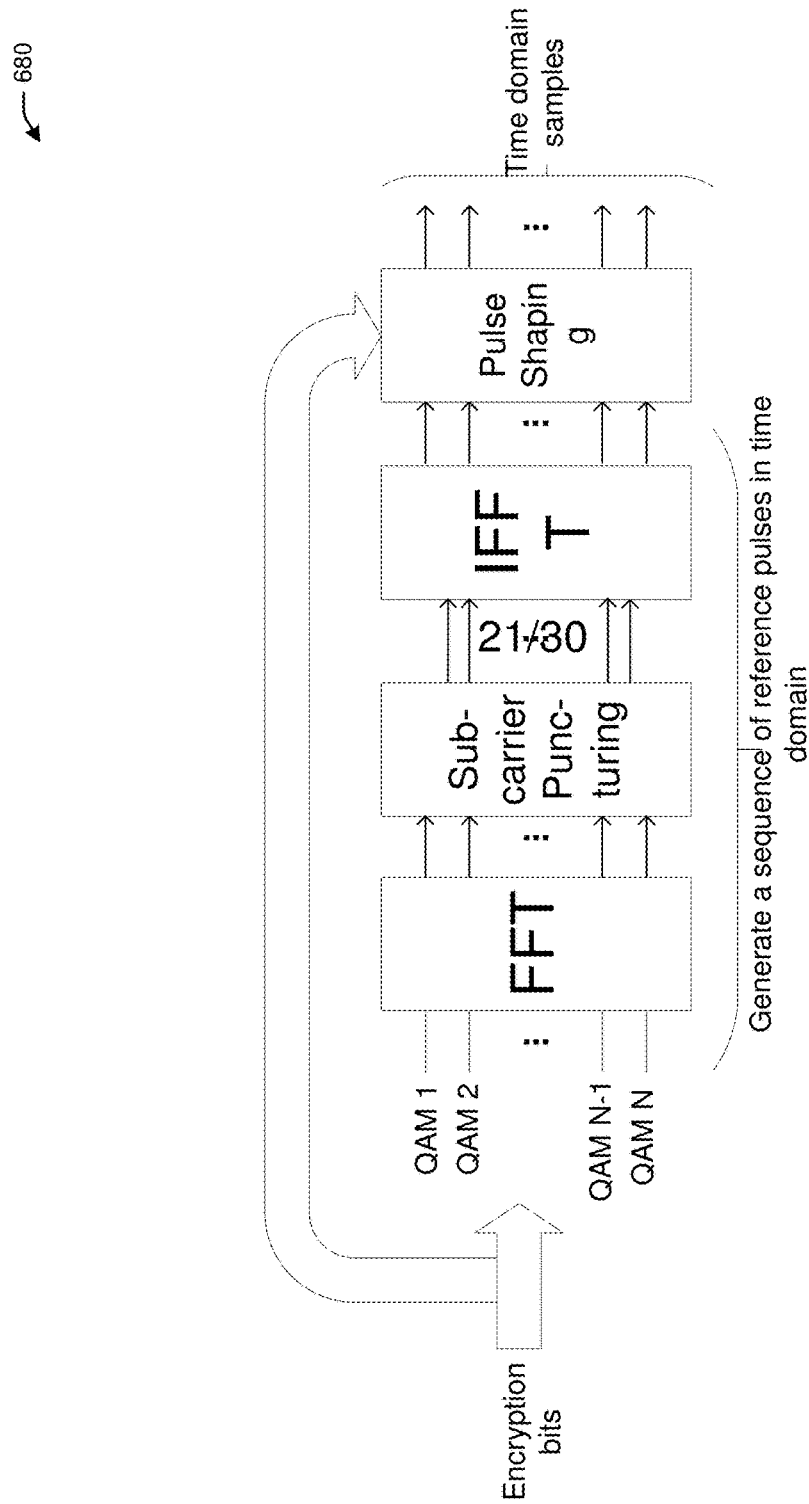
FIG. 6H depicts an example technique for enhanced channel sounding, in accordance with one or more example embodiments of the present disclosure.

FIG. 6H depicts an example technique 680 for enhanced channel sounding, in accordance with one or more example embodiments of the present disclosure.

An example of generating the sounding signal is illustrated in FIG. 6H. From the left to the right, part of the encryption bits determine a set of QAM symbols e.g. QPSK or 16QAM or 64QAM symbols, which may be multiplied with the reference pulses, respectively. After FFT or DFT, some part of the output signals may be punctured or removed to make room for DC and edge subcarriers. After the puncturing, the remaining signals are loaded onto the active subcarriers in frequency domain before going into time domain. The IFFT or IDFT converts the loaded signals to time domain. If there is no puncturing for the DC and edge subcarriers, the time domain signals may consist of Nyquist pulses e.g. sinc pulses, where the reference pulse is a Nyquist pulse. The puncturing introduces some inter-pulse interference such that the reference pulse is not a true Nyquist pulse. Before transmission, the reference pulses are shaped for adding strong inter-pulse interferences and getting a pulse shape unknown to the attacker. The pulse shaping can be implemented as an FIR filter. In addition, circular convolution may be used in the pulse shaping. For example, for 20 MHz sounding, there are 128 QAM symbols before FFT, 122 active subcarriers before IFFT, 128 samples for the reference pulses before pulse shaping, and still 128 time samples after the pulse shaping with circular convolution.

Figure 6I:
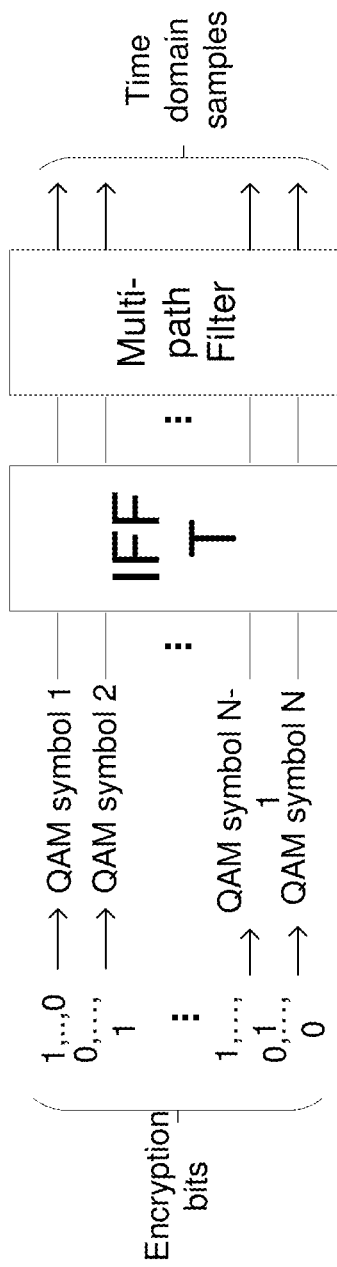
FIG. 6I depicts an example technique for enhanced channel sounding, in accordance with one or more example embodiments of the present disclosure.

FIG. 6I depicts an example technique 690 for enhanced channel sounding, in accordance with one or more example embodiments of the present disclosure.

The idea of introducing multipaths in FIG. 6H may be applied to any sounding signal (e.g. the 8PSK-Golay in the 802.11az technical standard) and the other options in the disclosure. For example, the sounding transmitter may first generate the sounding signal using OFDM and QAM modulations and then pass the sounding signal to a multipath filter to add inter-symbol interference as illustrated in FIG. 6I. The multipath filter may be the same the shaping filter as in FIG. 6H. The multipath filter may be an FIR filter and the filtering operation may be circular convolution. Since the attacker may not know the filter taps of the multipath filter, the detection complexity of the QAM symbol is increased exponentially with the number of taps in the multipath filter. The multipath taps are determined by part of the encryption bits and the encryption bits are known to the intended receiver. The intended receiver can undo the effect of introduced multipaths and estimate the time of arrival of the sounded channel.

The example in FIG. 6I adds inter-symbol interference in the time domain.

Figure 6J:
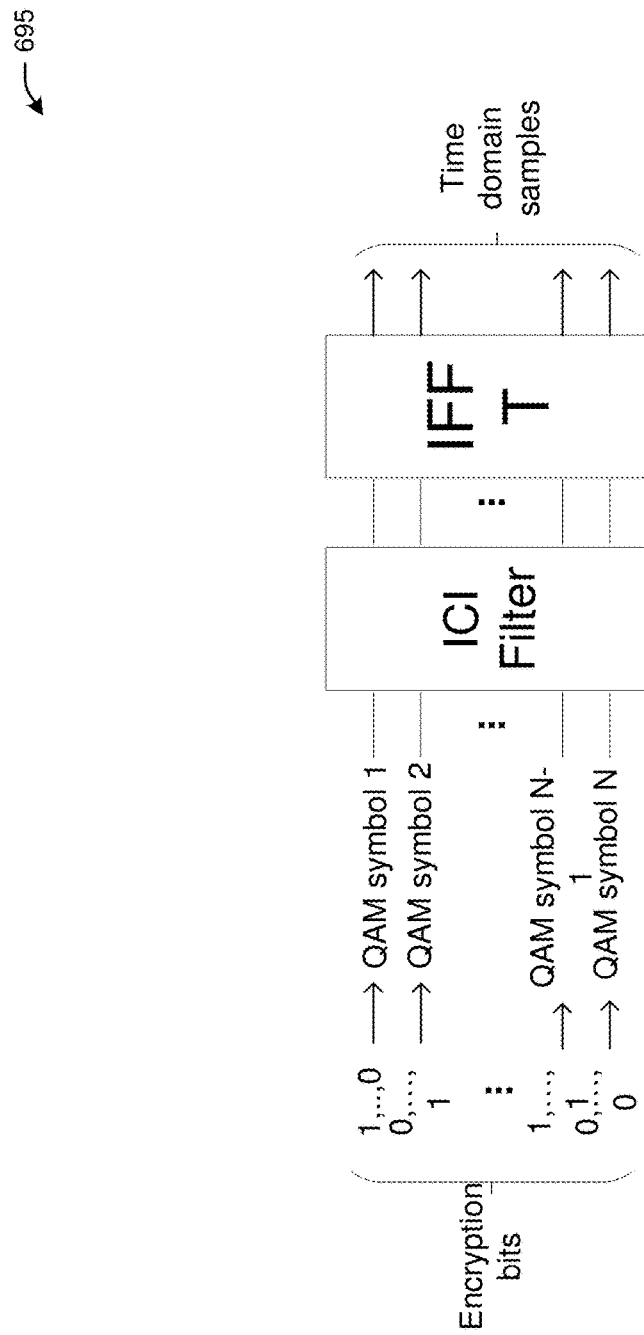
FIG. 6J depicts an example technique for enhanced channel sounding, in accordance with one or more example embodiments of the present disclosure.

FIG. 6J depicts an example technique 695 for enhanced channel sounding, in accordance with one or more example embodiments of the present disclosure.

The interference introduced by the sounding transmitter can be added in frequency domain as illustrated in FIG. 6J, which is a special case of the schemes in FIGS. 5G, 6A, 6C, and 6D. The inter-carrier interference (ICI) filter can be an FIR filter, whose filter taps may be unknown to the attacker. Circular convolution may be used by the ICI filter.

It is understood that the above descriptions are for purposes of illustration and are not meant to be limiting.

Figure 7:
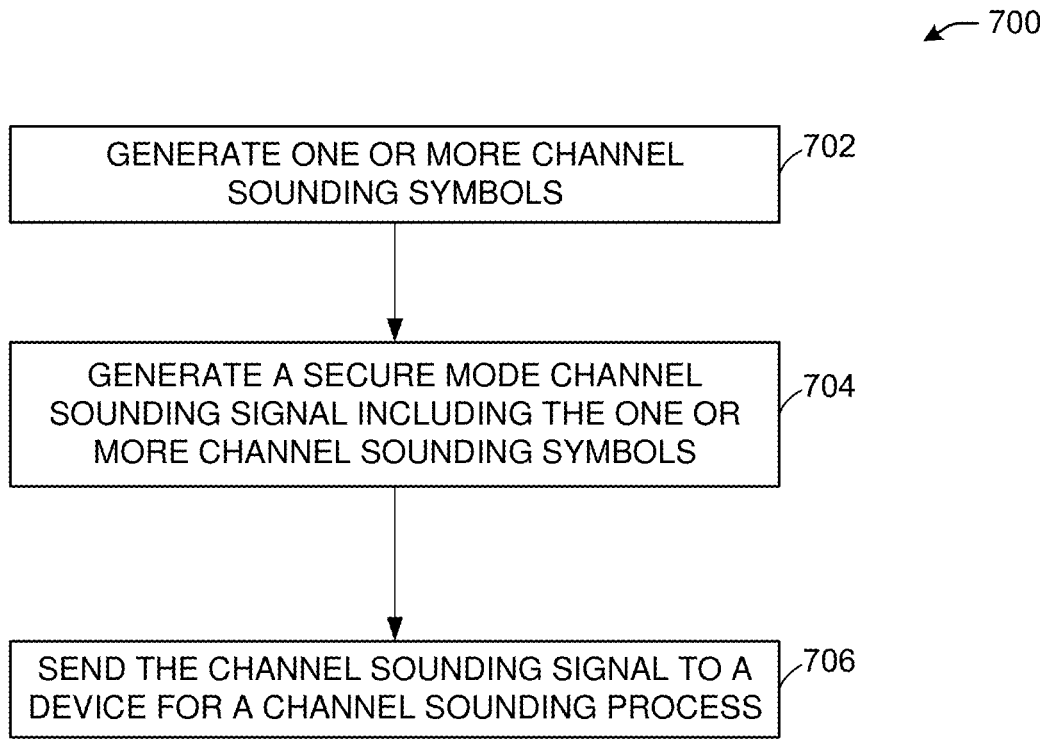
FIG. 7 illustrates a flow diagram of illustrative process for enhanced channel sounding, in accordance with one or more example embodiments of the present disclosure.

FIG. 7 illustrates a flow diagram of illustrative process 700 for enhanced channel sounding, in accordance with one or more example embodiments of the present disclosure.

At block 702, a device (e.g., the user device(s) 120 and/or the AP 102 of FIG. 1, the AP 202 of FIG. 2A, the STA 204 or 206 of FIG. 2A, the AP 252 of FIG. 2B, the STA 254 or 256 of FIG. 2B) may generate one or more symbols for channel sounding (e.g., channel sounding symbols). The channel sounding symbols may be included in one or more HEz-LTF fields of a sounding frame (e.g., the NPDs of FIGS. 2A and 2B), for which the number of symbols may depend on the number of space-time streams used in transmission and/or based on a number of users associated with the transmission. The symbols may be generated using any of the enhanced techniques shown in FIGS. 5A-6J. For example, any symbol may include multiple frequency subcarriers, and the amplitude of the subcarriers of a symbol may vary (e.g., as shown in FIG. 5A). In this manner, the number of constellation points of the symbols may be greater than the number of constellation points used in some existing channel sounding symbols (e.g., those generated using 8PSK or other techniques where the amplitude of the subcarriers remains the same across all subcarriers of a HE-LTF sounding symbol). The subcarrier values of the sounding symbols may be random values (e.g., using 64QAM).

At block 704, the device may generate an 802.11az secure mode sounding signal (e.g., sounding/ranging NDP) that includes the one or more sounding symbols. The sounding signal may be trigger-based (e.g., in response to a received trigger frame as shown in FIG. 2A) or non-trigger-based (e.g., as shown in FIG. 2B). The sounding symbols may be proceeded in the sounding signal by other fields, such as an HE-SIG-A field and an HE-STF field.

At block 706, the device may send the 802.11az secure mode sounding signal. The 802.11az secure mode sounding signal may be sent as part of a channel sounding process according to FIG. 2A or FIG. 2B, for example.

It is understood that the above descriptions are for purposes of illustration and are not meant to be limiting.

FIG. 8 shows a functional diagram of an exemplary communication station 800, in accordance with one or more example embodiments of the present disclosure. In one embodiment, FIG. 8 illustrates a functional block diagram of a communication station that may be suitable for use as an AP 102 (FIG. 1) or a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in the above figures, diagrams, and flows.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), an enhanced sounding for secure mode device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 902 for generation and processing of the baseband signals and for controlling operations of the main memory 904, the storage device 916, and/or the enhanced sounding for secure mode device 919. The baseband processor may be provided on a single radio card, a single chip, or an integrated circuit (IC).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The enhanced sounding for secure mode device 919 may carry out or perform any of the operations and processes (e.g., process 700) described and shown above.

It is understood that the above are only a subset of what the enhanced sounding for secure mode device 919 may be configured to perform and that other functions included throughout this disclosure may also be performed by the enhanced sounding for secure mode device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 10:
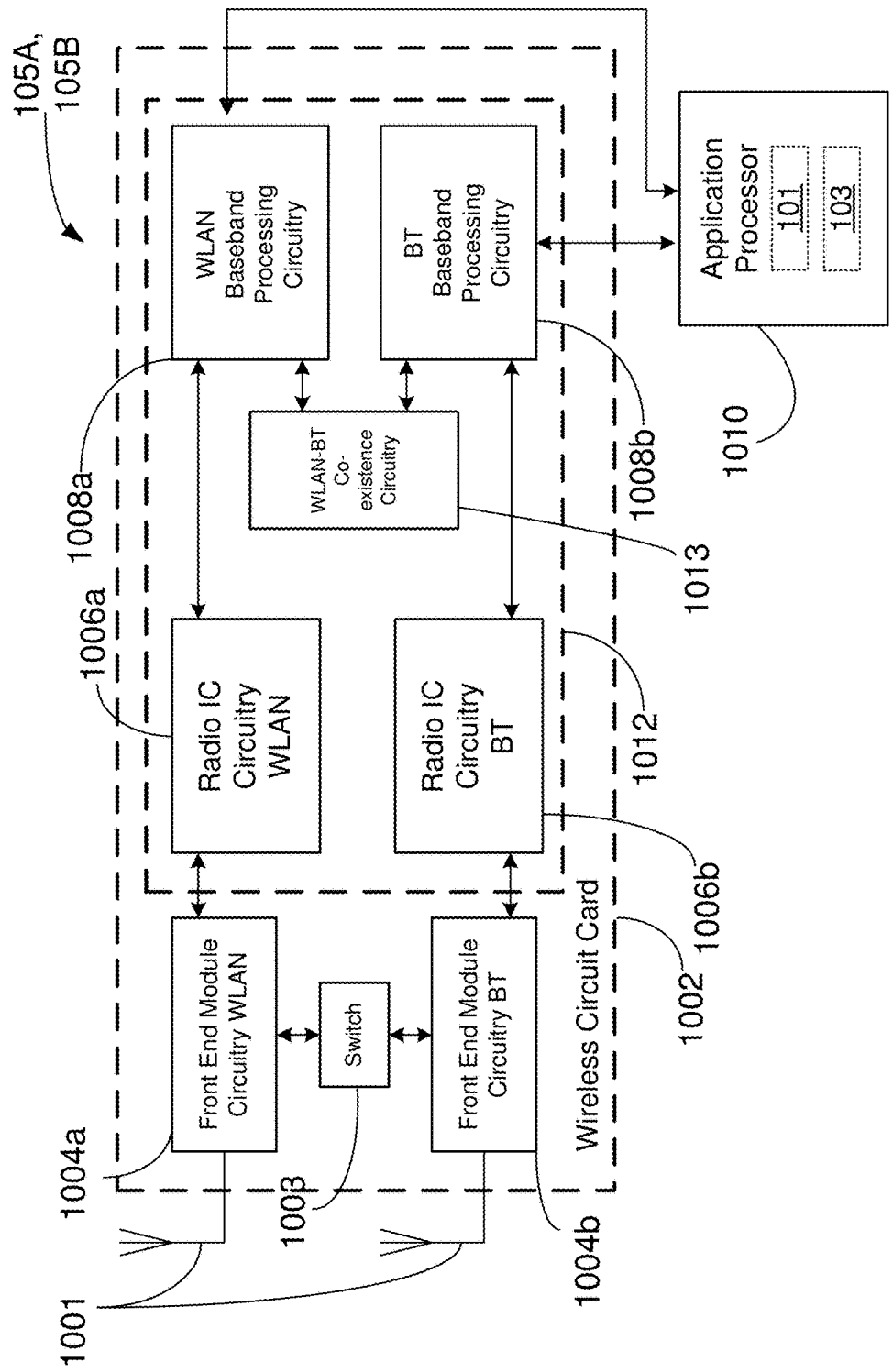
FIG. 10 is a block diagram of a radio architecture in accordance with some examples.

FIG. 10 is a block diagram of a radio architecture 105A, 105B in accordance with some embodiments that may be implemented in any one of the example AP 102 and/or the example STA 120 of FIG. 1. Radio architecture 105A, 105B may include radio front-end module (FEM) circuitry 1004a-b, radio IC circuitry 1006a-b and baseband processing circuitry 1008a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1004a-b may include a WLAN or Wi-Fi FEM circuitry 1004a and a Bluetooth (BT) FEM circuitry 1004b. The WLAN FEM circuitry 1004a may include a receive signal path comprising circuitry configured to operate on WLAN RF signals received from one or more antennas 1001, to amplify the received signals and to provide the amplified versions of the received signals to the WLAN radio IC circuitry 1006a for further processing. The BT FEM circuitry 1004b may include a receive signal path which may include circuitry configured to operate on BT RF signals received from one or more antennas 1001, to amplify the received signals and to provide the amplified versions of the received signals to the BT radio IC circuitry 1006b for further processing. FEM circuitry 1004a may also include a transmit signal path which may include circuitry configured to amplify WLAN signals provided by the radio IC circuitry 1006a for wireless transmission by one or more of the antennas 1001. In addition, FEM circuitry 1004b may also include a transmit signal path which may include circuitry configured to amplify BT signals provided by the radio IC circuitry 1006b for wireless transmission by the one or more antennas. In the embodiment of FIG. 10, although FEM 1004a and FEM 1004b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1006a-b as shown may include WLAN radio IC circuitry 1006a and BT radio IC circuitry 1006b. The WLAN radio IC circuitry 1006a may include a receive signal path which may include circuitry to down-convert WLAN RF signals received from the FEM circuitry 1004a and provide baseband signals to WLAN baseband processing circuitry 1008a. BT radio IC circuitry 1006b may in turn include a receive signal path which may include circuitry to down-convert BT RF signals received from the FEM circuitry 1004b and provide baseband signals to BT baseband processing circuitry 1008b. WLAN radio IC circuitry 1006a may also include a transmit signal path which may include circuitry to up-convert WLAN baseband signals provided by the WLAN baseband processing circuitry 1008a and provide WLAN RF output signals to the FEM circuitry 1004a for subsequent wireless transmission by the one or more antennas 1001. BT radio IC circuitry 1006b may also include a transmit signal path which may include circuitry to up-convert BT baseband signals provided by the BT baseband processing circuitry 1008b and provide BT RF output signals to the FEM circuitry 1004b for subsequent wireless transmission by the one or more antennas 1001. In the embodiment of FIG. 10, although radio IC circuitries 1006a and 1006b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1008a-b may include a WLAN baseband processing circuitry 1008a and a BT baseband processing circuitry 1008b. The WLAN baseband processing circuitry 1008a may include a memory, such as, for example, a set of RAM arrays in a Fast Fourier Transform or Inverse Fast Fourier Transform block (not shown) of the WLAN baseband processing circuitry 1008a. Each of the WLAN baseband circuitry 1008a and the BT baseband circuitry 1008b may further include one or more processors and control logic to process the signals received from the corresponding WLAN or BT receive signal path of the radio IC circuitry 1006a-b, and to also generate corresponding WLAN or BT baseband signals for the transmit signal path of the radio IC circuitry 1006a-b. Each of the baseband processing circuitries 1008a and 1008b may further include physical layer (PHY) and medium access control layer (MAC) circuitry, and may further interface with a device for generation and processing of the baseband signals and for controlling operations of the radio IC circuitry 1006a-b.

Referring still to FIG. 10, according to the shown embodiment, WLAN-BT coexistence circuitry 1013 may include logic providing an interface between the WLAN baseband circuitry 1008a and the BT baseband circuitry 1008b to enable use cases requiring WLAN and BT coexistence. In addition, a switch 1003 may be provided between the WLAN FEM circuitry 1004a and the BT FEM circuitry 1004b to allow switching between the WLAN and BT radios according to application needs. In addition, although the antennas 1001 are depicted as being respectively connected to the WLAN FEM circuitry 1004a and the BT FEM circuitry 1004b, embodiments include within their scope the sharing of one or more antennas as between the WLAN and BT FEMs, or the provision of more than one antenna connected to each of FEM 1004a or 1004b.

In some embodiments, the front-end module circuitry 1004a-b, the radio IC circuitry 1006a-b, and baseband processing circuitry 1008a-b may be provided on a single radio card, such as wireless radio card 1002. In some other embodiments, the one or more antennas 1001, the FEM circuitry 1004a-b and the radio IC circuitry 1006a-b may be provided on a single radio card. In some other embodiments, the radio IC circuitry 1006a-b and the baseband processing circuitry 1008a-b may be provided on a single chip or integrated circuit (IC), such as IC 1012.

In some embodiments, the wireless radio card 1002 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 10, the BT baseband circuitry 1008b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 11:
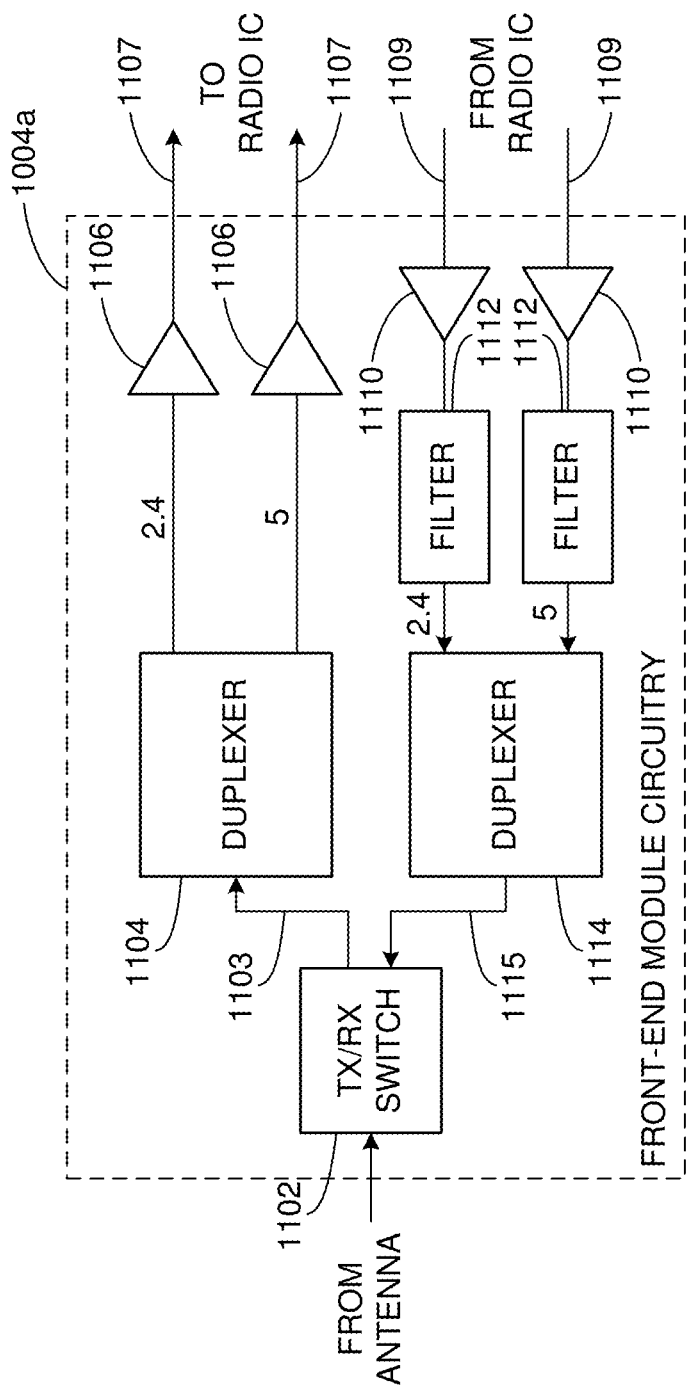
FIG. 11 illustrates an example front-end module circuitry for use in the radio architecture of FIG. 10, in accordance with one or more example embodiments of the present disclosure.

FIG. 11 illustrates WLAN FEM circuitry 1004a in accordance with some embodiments. Although the example of FIG. 11 is described in conjunction with the WLAN FEM circuitry 1004a, the example of FIG. 11 may be described in conjunction with the example BT FEM circuitry 1004b (FIG. 10), although other circuitry configurations may also be suitable.

In some embodiments, the FEM circuitry 1004a may include a TX/RX switch 1102 to switch between transmit mode and receive mode operation. The FEM circuitry 1004a may include a receive signal path and a transmit signal path. The receive signal path of the FEM circuitry 1004a may include a low-noise amplifier (LNA) 1106 to amplify received RF signals 1103 and provide the amplified received RF signals 1107 as an output (e.g., to the radio IC circuitry 1006a-b (FIG. 10)). The transmit signal path of the circuitry 1004a may include a power amplifier (PA) to amplify input RF signals 1109 (e.g., provided by the radio IC circuitry 1006a-b), and one or more filters 1112, such as band-pass filters (BPFs), low-pass filters (LPFs) or other types of filters, to generate RF signals 1115 for subsequent transmission (e.g., by one or more of the antennas 1001 (FIG. 10)) via an example duplexer 1114.

In some dual-mode embodiments for Wi-Fi communication, the FEM circuitry 1004a may be configured to operate in either the 2.4 GHz frequency spectrum or the 5 GHz frequency spectrum. In these embodiments, the receive signal path of the FEM circuitry 1004a may include a receive signal path duplexer 1104 to separate the signals from each spectrum as well as provide a separate LNA 1106 for each spectrum as shown. In these embodiments, the transmit signal path of the FEM circuitry 1004a may also include a power amplifier 1110 and a filter 1112, such as a BPF, an LPF or another type of filter for each frequency spectrum and a transmit signal path duplexer 1104 to provide the signals of one of the different spectrums onto a single transmit path for subsequent transmission by the one or more of the antennas 1001 (FIG. 10). In some embodiments, BT communications may utilize the 2.4 GHz signal paths and may utilize the same FEM circuitry 1004a as the one used for WLAN communications.

Figure 12:
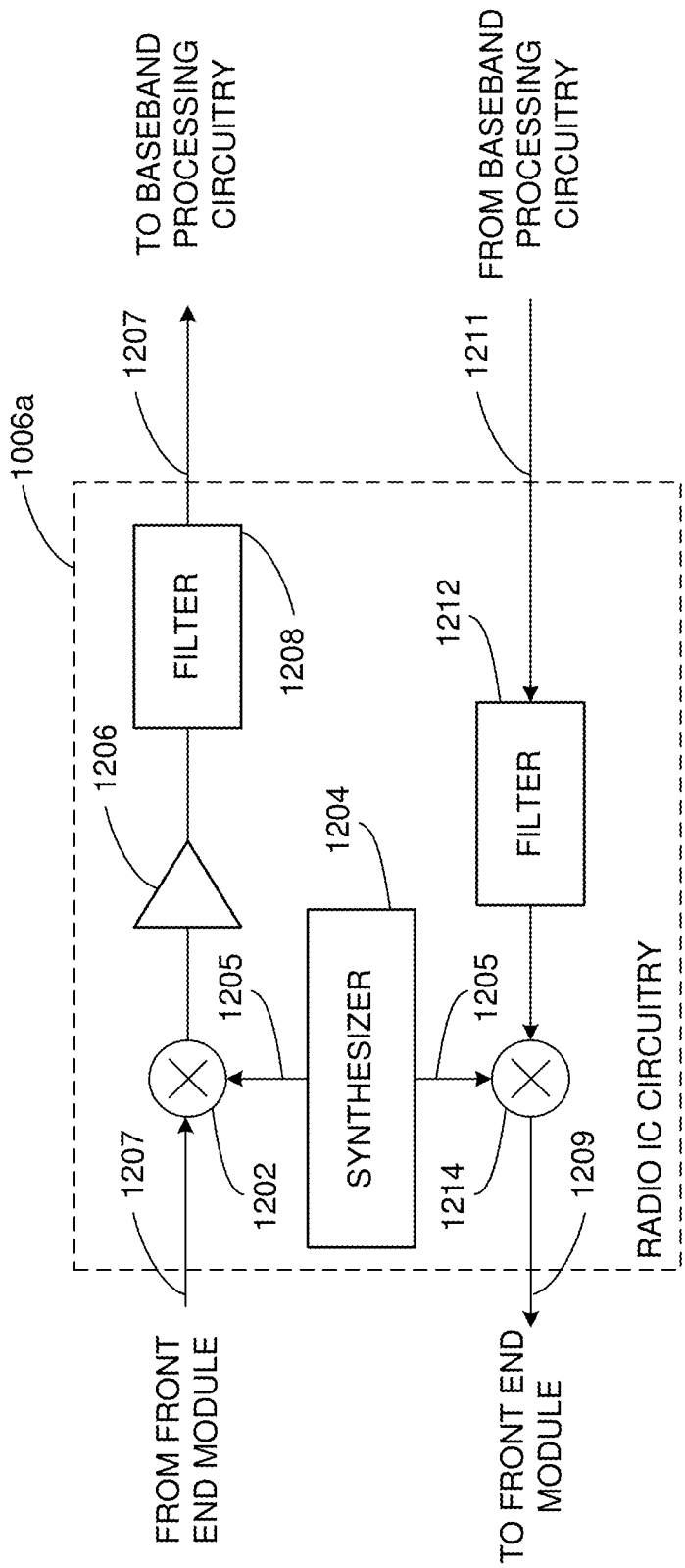
FIG. 12 illustrates an example radio IC circuitry for use in the radio architecture of FIG. 10, in accordance with one or more example embodiments of the present disclosure.

FIG. 12 illustrates radio IC circuitry 1006a in accordance with some embodiments. The radio IC circuitry 1006a is one example of circuitry that may be suitable for use as the WLAN or BT radio IC circuitry 1006a/1006b (FIG. 10), although other circuitry configurations may also be suitable. Alternatively, the example of FIG. 12 may be described in conjunction with the example BT radio IC circuitry 1006b.

In some embodiments, the radio IC circuitry 1006a may include a receive signal path and a transmit signal path. The receive signal path of the radio IC circuitry 1006a may include at least mixer circuitry 1202, such as, for example, down-conversion mixer circuitry, amplifier circuitry 1206 and filter circuitry 1208. The transmit signal path of the radio IC circuitry 1006a may include at least filter circuitry 1212 and mixer circuitry 1214, such as, for example, upconversion mixer circuitry. Radio IC circuitry 1006a may also include synthesizer circuitry 1204 for synthesizing a frequency 1205 for use by the mixer circuitry 1202 and the mixer circuitry 1214. The mixer circuitry 1202 and/or 1214 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 12 illustrates only a simplified version of a radio IC circuitry, and may include, although not shown, embodiments where each of the depicted circuitries may include more than one component. For instance, mixer circuitry 1214 may each include one or more mixers, and filter circuitries 1208 and/or 1212 may each include one or more filters, such as one or more BPFs and/or LPFs according to application needs. For example, when mixer circuitries are of the direct-conversion type, they may each include two or more mixers.

In some embodiments, mixer circuitry 1202 may be configured to down-convert RF signals 1107 received from the FEM circuitry 1004a-b (FIG. 10) based on the synthesized frequency 1205 provided by synthesizer circuitry 1204. The amplifier circuitry 1206 may be configured to amplify the down-converted signals and the filter circuitry 1208 may include an LPF configured to remove unwanted signals from the down-converted signals to generate output baseband signals 1207. Output baseband signals 1207 may be provided to the baseband processing circuitry 1008a-b (FIG. 10) for further processing. In some embodiments, the output baseband signals 1207 may be zero-frequency baseband signals, although this is not a requirement. In some embodiments, mixer circuitry 1202 may comprise passive mixers, although the scope of the embodiments is not limited in this respect.

In some embodiments, the mixer circuitry 1214 may be configured to up-convert input baseband signals 1211 based on the synthesized frequency 1205 provided by the synthesizer circuitry 1204 to generate RF output signals 1109 for the FEM circuitry 1004a-b. The baseband signals 1211 may be provided by the baseband processing circuitry 1008a-b and may be filtered by filter circuitry 1212. The filter circuitry 1212 may include an LPF or a BPF, although the scope of the embodiments is not limited in this respect.

In some embodiments, the mixer circuitry 1202 and the mixer circuitry 1214 may each include two or more mixers and may be arranged for quadrature down-conversion and/or upconversion respectively with the help of synthesizer 1204. In some embodiments, the mixer circuitry 1202 and the mixer circuitry 1214 may each include two or more mixers each configured for image rejection (e.g., Hartley image rejection). In some embodiments, the mixer circuitry 1202 and the mixer circuitry 1214 may be arranged for direct down-conversion and/or direct upconversion, respectively. In some embodiments, the mixer circuitry 1202 and the mixer circuitry 1214 may be configured for super-heterodyne operation, although this is not a requirement.

Mixer circuitry 1202 may comprise, according to one embodiment: quadrature passive mixers (e.g., for the in-phase (I) and quadrature phase (Q) paths). In such an embodiment, RF input signal 1107 from FIG. 12 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1205 of synthesizer 1204 (FIG. 12). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1107 (FIG. 11) may comprise a balanced signal, although the scope of the embodiments is not limited in this respect. The I and Q baseband output signals may be provided to low-noise amplifier, such as amplifier circuitry 1206 (FIG. 12) or to filter circuitry 1208 (FIG. 12).

In some embodiments, the output baseband signals 1207 and the input baseband signals 1211 may be analog baseband signals, although the scope of the embodiments is not limited in this respect. In some alternate embodiments, the output baseband signals 1207 and the input baseband signals 1211 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1204 may be a fractional-N synthesizer or a fractional N/N+1 synthesizer, although the scope of the embodiments is not limited in this respect as other types of frequency synthesizers may be suitable. For example, synthesizer circuitry 1204 may be a delta-sigma synthesizer, a frequency multiplier, or a synthesizer comprising a phase-locked loop with a frequency divider. According to some embodiments, the synthesizer circuitry 1204 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1204 may be provided by a voltage controlled oscillator (VCO), although that is not a requirement. A divider control input may further be provided by either the baseband processing circuitry 1008a-b (FIG. 10) depending on the desired output frequency 1205. In some embodiments, a divider control input (e.g., N) may be determined from a look-up table (e.g., within a Wi-Fi card) based on a channel number and a channel center frequency as determined or indicated by the example application processor 1010. The application processor 1010 may include, or otherwise be connected to, one of the example secure signal converter 101 or the example received signal converter 103 (e.g., depending on which device the example radio architecture is implemented in).

In some embodiments, synthesizer circuitry 1204 may be configured to generate a carrier frequency as the output frequency 1205, while in other embodiments, the output frequency 1205 may be a fraction of the carrier frequency (e.g., one-half the carrier frequency, one-third the carrier frequency). In some embodiments, the output frequency 1205 may be a LO frequency (fLO).

Figure 13:
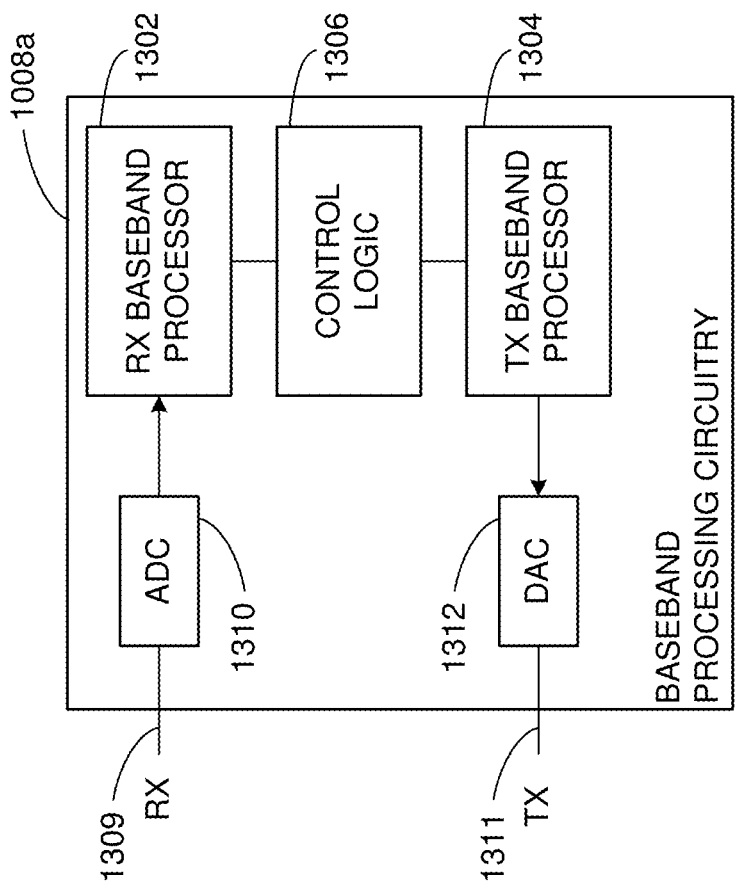
FIG. 13 illustrates an example baseband processing circuitry for use in the radio architecture of FIG. 10, in accordance with one or more example embodiments of the present disclosure.

FIG. 13 illustrates a functional block diagram of baseband processing circuitry 1008a in accordance with some embodiments. The baseband processing circuitry 1008a is one example of circuitry that may be suitable for use as the baseband processing circuitry 1008a (FIG. 10), although other circuitry configurations may also be suitable. Alternatively, the example of FIG. 12 may be used to implement the example BT baseband processing circuitry 1008b of FIG. 10.

The baseband processing circuitry 1008a may include a receive baseband processor (RX BBP) 1302 for processing receive baseband signals 1209 provided by the radio IC circuitry 1006a-b (FIG. 10) and a transmit baseband processor (TX BBP) 1304 for generating transmit baseband signals 1211 for the radio IC circuitry 1006a-b. The baseband processing circuitry 1008a may also include control logic 1306 for coordinating the operations of the baseband processing circuitry 1008a.

In some embodiments (e.g., when analog baseband signals are exchanged between the baseband processing circuitry 1008a-b and the radio IC circuitry 1006a-b), the baseband processing circuitry 1008a may include ADC 1310 to convert analog baseband signals 1309 received from the radio IC circuitry 1006a-b to digital baseband signals for processing by the RX BBP 1302. In these embodiments, the baseband processing circuitry 1008a may also include DAC 1312 to convert digital baseband signals from the TX BBP 1304 to analog baseband signals 1311.

In some embodiments that communicate OFDM signals or OFDMA signals, such as through baseband processor 1008a, the transmit baseband processor 1304 may be configured to generate OFDM or OFDMA signals as appropriate for transmission by performing an inverse fast Fourier transform (IFFT). The receive baseband processor 1302 may be configured to process received OFDM signals or OFDMA signals by performing an FFT. In some embodiments, the receive baseband processor 1302 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 10, in some embodiments, the antennas 1001 (FIG. 10) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1001 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: generate a channel sounding symbol comprising a first subcarrier and a second subcarrier, wherein a first amplitude of the first subcarrier is different than a second amplitude of the second subcarrier; generate a channel sounding signal comprising the channel sounding symbol; and send the channel sounding signal to a second device.

Example 2 may include the device of example 1 and/or some other example herein, wherein the channel sounding signal is a null data packet (NDP).

Example 3 may include the device of example 1 and/or some other example herein, wherein to generate the channel sounding symbol comprises to generate the channel sounding symbol using a 16 quadrature amplitude modulation (QAM) constellation.

Example 4 may include the device of example 1 and/or some other example herein, wherein to generate the channel sounding symbol comprises to generate the channel sounding symbol using a 64 QAM constellation.

Example 5 may include the device of example 1 and/or some other example herein, wherein to generate the channel sounding symbol comprises to generate the channel sounding symbol using a 256 QAM constellation.

Example 6 may include the device of example 1 and/or some other example herein, wherein to generate the channel sounding symbol comprises to generate the channel sounding symbol using a 1024 QAM constellation.

Example 7 may include the device of example 1 and/or some other example herein, wherein to generate the channel sounding symbol comprises to generate the channel sounding symbol using a phase-shift keying (PSK) modulation.

Example 8 may include the device of example 1 and/or some other example herein, wherein to generate the channel sounding symbol comprises to generate the channel sounding symbol using quadrature phase-shift keying (QPSK) modulation.

Example 9 may include the device of example 1 and/or some other example herein, wherein the processing circuitry is further configured to: generate a second channel sounding symbol comprising a third subcarrier and a fourth subcarrier, wherein a third amplitude of the third subcarrier is different than a fourth amplitude of the fourth subcarrier, wherein the channel sounding symbol further comprises the second channel sounding symbol.

Example 10 may include the device of example 1 and/or some other example herein, wherein the processing circuitry is further configured to: generate a secure high efficiency long training field (HEz-LTF) comprising the channel sounding symbol, wherein the channel sounding symbol further comprises the HEz-LTF.

Example 11 may include the device of example 1 and/or some other example herein, further comprising a transceiver configured to transmit and receive wireless signals.

Example 12 may include the device of example 1 and/or some other example herein, further comprising an antenna coupled to the transceiver to cause to send the channel sounding signal.

Example 13 may include a non-transitory computer-readable medium storing computer-executable instructions which when executed by one or more processors result in performing operations comprising: generating, by a first device, a channel sounding symbol comprising a first subcarrier and a second subcarrier, wherein a first amplitude of the first subcarrier is different than a second amplitude of the second subcarrier; generating, by the first device, a channel sounding signal comprising the channel sounding symbol; sending, by the first device, the channel sounding signal to a second device.

Example 14 may include the non-transitory computer-readable medium of example 13 and/or some other example herein, wherein the channel sounding signal is a null data packet (NDP).

Example 15 may include the non-transitory computer-readable medium of example 13 and/or some other example herein, wherein generating the channel sounding symbol comprises generating the channel sounding symbol using a 16 quadrature amplitude modulation (QAM) constellation.

Example 16 may include the non-transitory computer-readable medium of example 13 and/or some other example herein, wherein generating the channel sounding symbol comprises generating the channel sounding symbol using a 64 QAM or greater constellation.

Example 17 may include the non-transitory computer-readable medium of example 13 and/or some other example herein, wherein generating the channel sounding symbol comprises generating the channel sounding symbol using phase-shift keying (PSK) modulation.

Example 18 may include the non-transitory computer-readable medium of example 13 and/or some other example herein, wherein generating the channel sounding symbol comprises generating the channel sounding symbol using quadrature phase-shift keying (QPSK) modulation.

Example 19 may include a method comprising: generating, by processing circuitry of a first device, a channel sounding symbol comprising a first subcarrier and a second subcarrier, wherein a first amplitude of the first subcarrier is different than a second amplitude of the second subcarrier; generating, by the processing circuitry, a channel sounding signal comprising the channel sounding symbol; sending, by the processing circuitry, the channel sounding signal to a second device.

Example 20 may include the method of example 19 and/or some other example herein, wherein generating the channel sounding symbol comprises generating the channel sounding symbol using a 64 QAM or greater constellation.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
generate a high efficiency (HE) long training field (HE-LTF) sequence comprising subcarriers phase-shifted by an integer multiple of $\pi/4$;
generate a secure null data packet (NDP) comprising the HE-LTF sequence; and
transmit the secure NDP using a first spatial stream.

2. The device of claim 1, wherein the processing circuitry is further configured to:
generate a second HE-LTF sequence comprising the subcarriers phase-shifted by a second integer multiple of $\pi/4$, the second integer multiple different than the first integer multiple;

generate a second secure NDP comprising the second HE-LTF sequence; and transmit the second secure NDP using a second spatial stream.

3. The device of claim 1, wherein the subcarriers are phase-shifted by a pseudorandom phase rotation.

4. The device of claim 3, wherein the pseudorandom phase rotation is based on pseudorandom octets.

5. The device of claim 1, wherein the subcarriers are phase-shifted by a value included in a table of phase-shift values.

6. The device of claim 1, further comprising a transceiver configured to transmit and receive wireless signals comprising the secure NDP.

7. The device of claim 6, further comprising an antenna coupled to the transceiver to send the secure NDP.

8. A non-transitory computer-readable medium storing computer-executable instructions which when executed by one or more processors result in performing operations comprising:

generating a high efficiency (HE) long training field (HE-LTF) sequence comprising subcarriers phase-shifted by an integer multiple of $\pi/4$;

generating a secure null data packet (NDP) comprising the HE-LTF sequence; and transmitting the secure NDP using a first spatial stream.

9. The non-transitory computer-readable medium of claim 8, the operations further comprising:

generating a second HE-LTF sequence comprising the subcarriers phase-shifted by a second integer multiple of $\pi/4$, the second integer multiple different than the first integer multiple;

generating a second secure NDP comprising the second HE-LTF sequence; and transmitting the second secure NDP using a second spatial stream.

10. The non-transitory computer-readable medium of claim 8, wherein the subcarriers are phase-shifted by a pseudorandom phase rotation.

11. The non-transitory computer-readable medium of claim 10, wherein the pseudorandom phase rotation is based on pseudorandom octets.

12. The non-transitory computer-readable medium of claim 8, wherein the subcarriers are phase-shifted by a value included in a table of phase-shift values.

13. A method comprising:

generating, by processing circuitry of a device, a high efficiency (HE) long training field (HE-LTF) sequence comprising subcarriers phase-shifted by an integer multiple of $\pi/4$;

generating, by the processing circuitry, a secure null data packet (NDP) comprising the HE-LTF sequence; and transmitting, by the processing circuitry, the secure NDP using a first spatial stream.

14. The method of claim 13, further comprising:

generating a second HE-LTF sequence comprising the subcarriers phase-shifted by a second integer multiple of $\pi/4$, the second integer multiple different than the first integer multiple;

generating a second secure NDP comprising the second HE-LTF sequence; and transmitting the second secure NDP using a second spatial stream.

15. The method of claim 13, wherein the subcarriers are phase-shifted by a pseudorandom phase rotation.

16. The method of claim 15, wherein the pseudorandom phase rotation is based on pseudorandom octets.

17. The method of claim 13, wherein the subcarriers are phase-shifted by a value included in a table of phase-shift values.

* * * * *